(12) United States Patent
Granito et al.

(10) Patent No.: US 9,197,999 B2
(45) Date of Patent: *Nov. 24, 2015

(54) PROVIDING A LOCATION IDENTIFIER FOR A LOCATION WITH MULTIPLE CO-USERS

(71) Applicant: Facebook, Inc., Menlo Park, CA (US)

(72) Inventors: Jennifer Granito, Springfield, VA (US); Alexander Franco, Herndon, VA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,815

(22) Filed: Oct. 7, 2014

(65) Prior Publication Data

US 2015/0024792 A1    Jan. 22, 2015

Related U.S. Application Data

(60) Continuation of application No. 13/794,482, filed on Mar. 11, 2013, now Pat. No. 8,868,112, which is a continuation of application No. 13/768,440, filed on Feb. 15, 2013, now Pat. No. 8,787,940, which is a
(Continued)

(51) Int. Cl.
*H04W 4/02*       (2009.01)
*G01C 21/00*      (2006.01)
(Continued)

(52) U.S. Cl.
CPC .............. *H04W 4/023* (2013.01); *G01C 21/00* (2013.01); *H04L 12/5815* (2013.01);
(Continued)

(58) Field of Classification Search
CPC ......... H04W 4/02; H04W 12/02; H04L 12/58
USPC .................. 455/445, 456.1–456.3, 457, 566; 342/452
See application file for complete search history.

(56) References Cited

U.S. PATENT DOCUMENTS 4,837,798 A    6/1989   Cohen et al.
5,086,394 A    2/1992   Shapira
(Continued)

FOREIGN PATENT DOCUMENTS

EP    0862304    9/1998
EP    1176840    1/2002
(Continued)

OTHER PUBLICATIONS

U.S. Appl. No. 14/508,632, filed Oct. 7, 2014, Granito et al.
(Continued)

*Primary Examiner* — Sam Bhattacharya
(74) *Attorney, Agent, or Firm* — Keller Jolley Preece

(57) ABSTRACT

Providing location information on a mobile device includes receiving signals from external devices. Each signal includes information that specifies a geographic location for the external device that has provided the signal. A geographic location for the mobile device is calculated by using the information contained in each of the received signals. A representation of the geographic location of the mobile device is generated. The representation of the geographic location is included within an electronic message that provides information describing a user of the mobile device to other users of an electronic communications system. The electronic message is transmitted to another device to provide an indication of the geographic location for the user to one of the other users of the electronic communications system.

20 Claims, 11 Drawing Sheets

Related U.S. Application Data continuation of application No. 12/986,121, filed on Jan. 6, 2011, now Pat. No. 8,712,431, which is a division of application No. 12/581,669, filed on Oct. 19, 2009, now Pat. No. 7,890,123, which is a division of application No. 11/238,110, filed on Sep. 29, 2005, now Pat. No. 7,606,580.

(60) Provisional application No. 60/679,652, filed on May 11, 2005, provisional application No. 60/710,616, filed on Aug. 24, 2005.

(51) Int. Cl.
*H04L 12/58* (2006.01)
*H04L 29/08* (2006.01)
*G01S 5/00* (2006.01)

(52) U.S. Cl.
CPC .......... *H04L 12/5895* (2013.01); *H04L 51/043* (2013.01); *H04L 51/38* (2013.01); *H04L 67/18* (2013.01); *H04W 4/02* (2013.01); *G01S 5/0072* (2013.01)

(56) References Cited

U.S. PATENT DOCUMENTS

| | | |
|---|---|---|
| 5,276,905 A | 1/1994 | Hurst et al. |
| 5,327,486 A | 7/1994 | Wolff et al. |
| 5,533,110 A | 7/1996 | Pinard et al. |
| 5,548,637 A | 8/1996 | Heller et al. |
| 5,557,659 A | 9/1996 | Hyde-Thomson |
| 5,608,786 A | 3/1997 | Gordon |
| 5,694,616 A | 12/1997 | Johnson et al. |
| 5,721,906 A | 2/1998 | Siefert |
| 5,742,905 A | 4/1998 | Pepe et al. |
| 5,774,670 A | 6/1998 | Montulli |
| 5,793,365 A | 8/1998 | Tang et al. |
| 5,796,395 A | 8/1998 | de Hond |
| 5,802,470 A | 9/1998 | Gaulke et al. |
| 5,850,594 A | 12/1998 | Cannon et al. |
| 5,867,162 A | 2/1999 | O'Leary et al. |
| 5,870,744 A | 2/1999 | Sprague |
| 5,872,521 A | 2/1999 | Lopatukin et al. |
| 5,878,219 A | 3/1999 | Vance, Jr. et al. |
| 5,893,091 A | 4/1999 | Hunt et al. |
| 5,893,099 A | 4/1999 | Schreiber et al. |
| 5,920,692 A | 7/1999 | Nguyen et al. |
| 5,940,488 A | 8/1999 | DeGrazia et al. |
| 5,946,617 A | 8/1999 | Portaro et al. |
| 5,948,058 A | 9/1999 | Kudoh et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,960,173 A | 9/1999 | Tang et al. |
| 5,963,951 A | 10/1999 | Collins |
| 5,987,113 A | 11/1999 | James |
| 5,991,791 A | 11/1999 | Siefert |
| 5,995,023 A | 11/1999 | Kreft |
| 6,002,402 A | 12/1999 | Schacher |
| 6,009,413 A | 12/1999 | Webber et al. |
| 6,012,051 A | 1/2000 | Sammon, Jr. et al. |
| 6,014,135 A | 1/2000 | Fernandes |
| 6,014,638 A | 1/2000 | Burge et al. |
| 6,026,403 A | 2/2000 | Siefert |
| 6,026,429 A | 2/2000 | Jones et al. |
| 6,041,311 A | 3/2000 | Chislenko et al. |
| 6,049,533 A | 4/2000 | Norman et al. |
| 6,065,047 A | 5/2000 | Carpenter et al. |
| 6,073,138 A | 6/2000 | de l'Etraz et al. |
| 6,081,830 A | 6/2000 | Schindler |
| 6,085,223 A | 7/2000 | Carino, Jr. et al. |
| 6,088,435 A | 7/2000 | Barber et al. |
| 6,134,432 A | 10/2000 | Holmes et al. |
| 6,151,584 A | 11/2000 | Papierniak et al. |
| 6,161,130 A | 12/2000 | Horvitz et al. |
| 6,166,730 A | 12/2000 | Goode et al. |
| 6,175,831 B1 | 1/2001 | Weinreich et al. |
| 6,199,103 B1 | 3/2001 | Sakaguchi et al. |
| 6,212,550 B1 | 4/2001 | Segur |
| 6,249,282 B1 | 6/2001 | Sutcliffe et al. |
| 6,249,740 B1 | 6/2001 | Ito et al. |
| 6,260,148 B1 | 7/2001 | Aggarwal et al. |
| 6,269,369 B1 | 7/2001 | Robertson |
| 6,301,609 B1 | 10/2001 | Aravamudan et al. |
| 6,311,211 B1 | 10/2001 | Shaw |
| 6,314,450 B1 | 11/2001 | Hachiya et al. |
| 6,324,541 B1 | 11/2001 | de l'Etraz et al. |
| 6,330,590 B1 | 12/2001 | Cotten |
| 6,347,332 B1 | 2/2002 | Malet et al. |
| 6,351,698 B1 | 2/2002 | Kubota et al. |
| 6,363,392 B1 | 3/2002 | Halstead et al. |
| 6,374,246 B1 | 4/2002 | Matsuo |
| 6,374,290 B1 | 4/2002 | Scharber et al. |
| 6,389,127 B1 | 5/2002 | Vardi et al. |
| 6,389,372 B1 | 5/2002 | Glance et al. |
| 6,400,381 B1 | 6/2002 | Barrett et al. |
| 6,415,318 B1 | 7/2002 | Aggarwal et al. |
| 6,421,439 B1 | 7/2002 | Liffick |
| 6,421,709 B1 | 7/2002 | McCormick et al. |
| 6,425,012 B1 | 7/2002 | Trovato et al. |
| 6,430,604 B1 | 8/2002 | Ogle et al. |
| 6,434,599 B1 | 8/2002 | Porter |
| 6,446,112 B1 | 9/2002 | Bunney et al. |
| 6,449,344 B1 | 9/2002 | Goldfinger et al. |
| 6,449,634 B1 | 9/2002 | Capiel |
| 6,480,885 B1 | 11/2002 | Olivier |
| 6,484,196 B1 | 11/2002 | Maurille |
| 6,501,834 B1 | 12/2002 | Milewski et al. |
| 6,507,866 B1 | 1/2003 | Barchi |
| 6,525,747 B1 | 2/2003 | Bezos |
| 6,535,586 B1 | 3/2003 | Cloutier et al. |
| 6,539,421 B1 | 3/2003 | Appelman et al. |
| 6,545,660 B1 | 4/2003 | Shen et al. |
| 6,549,937 B1 | 4/2003 | Auerbach et al. |
| 6,557,027 B1 | 4/2003 | Cragun |
| 6,559,863 B1 | 5/2003 | Megiddo |
| 6,571,234 B1 | 5/2003 | Knight et al. |
| 6,580,790 B1 | 6/2003 | Henry et al. |
| 6,606,647 B2 | 8/2003 | Shah et al. |
| 6,615,241 B1 | 9/2003 | Miller et al. |
| 6,636,733 B1 | 10/2003 | Helferich |
| 6,640,230 B1 | 10/2003 | Alexander et al. |
| 6,654,683 B2 | 11/2003 | Jin et al. |
| 6,665,173 B2 | 12/2003 | Brandenberg et al. |
| 6,677,968 B1 | 1/2004 | Appelman |
| 6,678,719 B1 | 1/2004 | Stimmel |
| 6,691,162 B1 | 2/2004 | Wick |
| 6,697,807 B2 | 2/2004 | McGeachie |
| 6,701,348 B2 | 3/2004 | Sommerer |
| 6,714,791 B2 | 3/2004 | Friedman |
| 6,714,793 B1 | 3/2004 | Carey et al. |
| 6,731,308 B1 | 5/2004 | Tang et al. |
| 6,732,155 B2 | 5/2004 | Meek |
| 6,750,881 B1 | 6/2004 | Appelman |
| 6,772,188 B1 | 8/2004 | Cloutier |
| 6,781,608 B1 | 8/2004 | Crawford |
| 6,785,554 B1 | 8/2004 | Amerga |
| 6,785,681 B2 | 8/2004 | Keskar et al. |
| 6,788,769 B1 | 9/2004 | Waites |
| 6,799,039 B2 | 9/2004 | Wu et al. |
| 6,800,031 B2 | 10/2004 | Di Cesare |
| 6,834,195 B2 | 12/2004 | Brandenberg et al. |
| 6,839,737 B1 | 1/2005 | Friskel |
| 6,901,559 B1 | 5/2005 | Blum et al. |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 | 6/2005 | Appelman et al. |
| 6,917,965 B2 | 7/2005 | Gupta et al. |
| 6,941,345 B1 | 9/2005 | Kapil et al. |
| 6,950,861 B1 | 9/2005 | Amro et al. |
| 6,968,179 B1 | 11/2005 | De Vries |
| 6,993,564 B2 | 1/2006 | Whitten, II |

(56) References Cited

U.S. PATENT DOCUMENTS

| | | |
|---|---|---|
| 7,031,724 B2 | 4/2006 | Ross et al. |
| 7,035,865 B2 | 4/2006 | Doss et al. |
| 7,058,036 B1 | 6/2006 | Yu et al. |
| 7,058,690 B2 | 6/2006 | Maehiro |
| 7,068,309 B2 | 6/2006 | Toyama et al. |
| 7,082,047 B2 | 7/2006 | Chow |
| 7,099,862 B2 | 8/2006 | Fitzpatrick et al. |
| 7,099,921 B1 | 8/2006 | Engstrom et al. |
| 7,124,123 B1 | 10/2006 | Roskind et al. |
| 7,127,232 B2 | 10/2006 | O'Neil et al. |
| 7,177,880 B2 | 2/2007 | Ruvolo |
| 7,185,059 B2 | 2/2007 | Daniell et al. |
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,219,303 B2 | 5/2007 | Fish |
| 7,222,156 B2 | 5/2007 | Gupta et al. |
| 7,257,570 B2 | 8/2007 | Riise et al. |
| 7,271,742 B2 | 9/2007 | Sheha et al. |
| 7,275,215 B2 | 9/2007 | Werndorfer et al. |
| 7,289,814 B2 | 10/2007 | Amir et al. |
| 7,313,760 B2 | 12/2007 | Grossman et al. |
| 7,436,780 B2 | 10/2008 | Stephens et al. |
| 7,606,580 B2 | 10/2009 | Granito et al. |
| 7,765,265 B1 | 7/2010 | Granito |
| 7,890,123 B2 | 2/2011 | Granito et al. |
| 8,712,431 B2 | 4/2014 | Granito et al. |
| 8,719,354 B2 | 5/2014 | Granito et al. |
| 8,787,932 B2 | 7/2014 | Granito et al. |
| 8,787,940 B2 | 7/2014 | Granito et al. |
| 8,805,408 B2 | 8/2014 | Granito et al. |
| 8,818,407 B2 | 8/2014 | Granito et al. |
| 8,868,112 B2 | 10/2014 | Granito et al. |
| 2001/0005861 A1 | 6/2001 | Mousseau et al. |
| 2001/0013050 A1 | 8/2001 | Shah |
| 2001/0018663 A1 | 8/2001 | Dussell et al. |
| 2001/0044693 A1 | 11/2001 | Gotou et al. |
| 2002/0015061 A1 | 2/2002 | Maguire |
| 2002/0021307 A1 | 2/2002 | Glenn et al. |
| 2002/0023132 A1 | 2/2002 | Tornabene et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0059201 A1 | 5/2002 | Work |
| 2002/0065856 A1 | 5/2002 | Kisiel |
| 2002/0065894 A1 | 5/2002 | Dalal et al. |
| 2002/0077080 A1 | 6/2002 | Greene |
| 2002/0083136 A1 | 6/2002 | Whitten, II |
| 2002/0087620 A1 | 7/2002 | Rouse et al. |
| 2002/0091667 A1 | 7/2002 | Jaipuria et al. |
| 2002/0095465 A1 | 7/2002 | Banks et al. |
| 2002/0103801 A1 | 8/2002 | Lysons |
| 2002/0112181 A1 | 8/2002 | Smith |
| 2002/0116463 A1 | 8/2002 | Hart |
| 2002/0116641 A1 | 8/2002 | Mastrianni |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0174010 A1 | 11/2002 | Rice, III |
| 2002/0175953 A1 | 11/2002 | Lin |
| 2002/0178163 A1 | 11/2002 | Mayer |
| 2002/0181703 A1 | 12/2002 | Logan et al. |
| 2002/0184089 A1 | 12/2002 | Tsou et al. |
| 2002/0192942 A1 | 12/2002 | Dinesh |
| 2002/0193942 A1 | 12/2002 | Odakura et al. |
| 2002/0199095 A1 | 12/2002 | Bandini et al. |
| 2003/0004743 A1 | 1/2003 | Callegari |
| 2003/0004855 A1 | 1/2003 | Dutta et al. |
| 2003/0004872 A1 | 1/2003 | Gardi et al. |
| 2003/0009523 A1 | 1/2003 | Lindskog et al. |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick |
| 2003/0043201 A1 | 3/2003 | Abdelhadi et al. |
| 2003/0046198 A1 | 3/2003 | Knapp et al. |
| 2003/0050916 A1 | 3/2003 | Ortega et al. |
| 2003/0084103 A1 | 5/2003 | Weiner et al. |
| 2003/0093580 A1 | 5/2003 | Thomas et al. |
| 2003/0096621 A1 | 5/2003 | Jana et al. |
| 2003/0105822 A1 | 6/2003 | Gusler et al. |
| 2003/0126250 A1 | 7/2003 | Jhanji |
| 2003/0131061 A1 | 7/2003 | Newton et al. |
| 2003/0140103 A1 | 7/2003 | Szeto et al. |
| 2003/0167324 A1 | 9/2003 | Farnham et al. |
| 2003/0182394 A1 | 9/2003 | Ryngler et al. |
| 2003/0187813 A1 | 10/2003 | Goldman et al. |
| 2004/0015548 A1 | 1/2004 | Lee |
| 2004/0036649 A1 | 2/2004 | Taylor et al. |
| 2004/0054729 A1 | 3/2004 | Fukuizumi et al. |
| 2004/0056901 A1 | 3/2004 | March et al. |
| 2004/0111369 A1 | 6/2004 | Lane et al. |
| 2004/0117443 A1 | 6/2004 | Barsness |
| 2004/0122681 A1 | 6/2004 | Ruvolo |
| 2004/0122810 A1 | 6/2004 | Mayer |
| 2004/0122855 A1 | 6/2004 | Ruvolo |
| 2004/0128356 A1 | 7/2004 | Bernstein et al. |
| 2004/0179039 A1 | 9/2004 | Blattner et al. |
| 2004/0186738 A1 | 9/2004 | Reisman |
| 2004/0210844 A1 | 10/2004 | Pettinati et al. |
| 2004/0215648 A1 | 10/2004 | Marshall |
| 2004/0215721 A1 | 10/2004 | Szeto et al. |
| 2004/0243941 A1 | 12/2004 | Fish |
| 2004/0260762 A1 | 12/2004 | Fish |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0048961 A1 | 3/2005 | Ribaudo et al. |
| 2005/0050143 A1 | 3/2005 | Gusler et al. |
| 2005/0060377 A1 | 3/2005 | Lo et al. |
| 2005/0076078 A1 | 4/2005 | Salton |
| 2005/0076241 A1 | 4/2005 | Appelman |
| 2005/0080863 A1 | 4/2005 | Daniell |
| 2005/0086211 A1 | 4/2005 | Mayer |
| 2005/0091327 A1 | 4/2005 | Koch |
| 2005/0101335 A1 | 5/2005 | Kelly et al. |
| 2005/0102202 A1 | 5/2005 | Linden et al. |
| 2005/0113123 A1 | 5/2005 | Torvinen |
| 2005/0114229 A1 | 5/2005 | Ackley et al. |
| 2005/0153681 A1 | 7/2005 | Hanson |
| 2005/0166154 A1 | 7/2005 | Wilson et al. |
| 2005/0197846 A1 | 9/2005 | Pezaris |
| 2006/0005133 A1 | 1/2006 | Lyle et al. |
| 2006/0046743 A1 | 3/2006 | Mirho |
| 2006/0052091 A1 | 3/2006 | Onyon et al. |
| 2006/0075044 A1 | 4/2006 | Fox et al. |
| 2006/0160548 A1 | 7/2006 | Chen |
| 2006/0167991 A1 | 7/2006 | Heikes et al. |
| 2006/0168054 A1 | 7/2006 | Burkhart et al. |
| 2006/0173824 A1 | 8/2006 | Benksy et al. |
| 2006/0173963 A1 | 8/2006 | Roseway et al. |
| 2006/0173985 A1 | 8/2006 | Moore |
| 2006/0182248 A1 | 8/2006 | Smith et al. |
| 2006/0212561 A1 | 9/2006 | Feng |
| 2006/0256816 A1 | 11/2006 | Yarlagadda et al. |
| 2006/0258368 A1 | 11/2006 | Granito et al. |
| 2006/0259474 A1 | 11/2006 | Granito |
| 2006/0277187 A1 | 12/2006 | Roese et al. |
| 2007/0032225 A1 | 2/2007 | Konicek et al. |
| 2007/0043828 A1 | 2/2007 | Famolari et al. |
| 2007/0053335 A1 | 3/2007 | Onyon et al. |
| 2007/0085739 A1 | 4/2007 | Udall |
| 2007/0116037 A1 | 5/2007 | Moore |
| 2007/0149214 A1 | 6/2007 | Walsh et al. |
| 2007/0156664 A1 | 7/2007 | Norton et al. |
| 2007/0210937 A1 | 9/2007 | Smith et al. |
| 2007/0243880 A1 | 10/2007 | Gits et al. |
| 2007/0288852 A1 | 12/2007 | Fish |
| 2008/0228887 A1 | 9/2008 | Robertson et al. |
| 2009/0089316 A1 | 4/2009 | Kogan et al. |

(56) References Cited

U.S. PATENT DOCUMENTS

| | | |
|---|---|---|
| 2011/0066947 A1 | 3/2011 | Pei et al. |
| 2013/0066993 A1 | 3/2013 | Granito et al. |
| 2013/0066994 A1 | 3/2013 | Granito et al. |
| 2013/0066995 A1 | 3/2013 | Granito et al. |
| 2013/0179524 A1 | 7/2013 | Granito et al. |
| 2013/0179525 A1 | 7/2013 | Granito et al. |

FOREIGN PATENT DOCUMENTS

| | | |
|---|---|---|
| GB | 2357932 | 7/2001 |
| GB | 2368747 | 5/2002 |
| JP | 2000-499001 | 2/2000 |
| JP | 2000-259514 | 9/2000 |
| JP | 2000-284999 | 10/2000 |
| JP | 2001-084320 | 3/2001 |
| WO | WO 97/10558 | 3/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/79396 | 12/2000 |
| WO | WO 01/06748 | 1/2001 |
| WO | WO 01/22258 | 3/2001 |
| WO | WO 01/24036 | 4/2001 |
| WO | WO 01/43357 | 6/2001 |
| WO | WO 01/67787 | 9/2001 |
| WO | WO 01/80079 | 10/2001 |
| WO | WO 01/98856 | 12/2001 |
| WO | WO 02/03216 | 1/2002 |
| WO | WO 02/35781 | 5/2002 |
| WO | WO 02/062039 | 8/2002 |
| WO | WO 02/073886 | 9/2002 |
| WO | WO 2004/028178 | 4/2004 |
| WO | WO 2005/086723 | 9/2005 |
| WO | WO 2007/061869 | 5/2007 |

OTHER PUBLICATIONS

U.S. Appl. No. 14/510,422, filed Oct. 7, 2014, Granito et al.
"A Countermeasure to Duplicate-detecting Anti-spam Techniques," Robert J. Hall, AT&T Labs Technical Report 99.9.1, 1999, Abst. and pp. 1-26.
"A Reputation System for Peer-to-Peer Networks," Gupta et al., Jun. 1-3, 2003, NOSSDAV'03, Monterey, California, pp. 144-152.
"About Internet directory services," Outlook SR-1 (9.0.0.4527) Help File, on or before Aug. 10, 2001, p. 1.
"Active Directory Features," [online], Jun. 15, 1999 [retrieved on May 13, 2003]. Retrieved from the Internet <http://www.microsoft.com/windows2000/server/evaluation/features/adlist.asp>, pp. 1-4.
"Active Directory Service Overview," [online], Nov. 30, 2001 [Retrieved on May 13, 2003]. Retreived from the Internet <http://www.microsoft.com/windows2000/server/evaluation/business/addatasheet.asp> pp. 1-5.
"Active Directory," [online], [retrieved on May 13, 2003]. Retrieved from the Internet <http://www.microsoft.com/windows2000/technologies/directory/AD/default.asp>, pp. 1-13.
"Announce: Implementation of E-mail Spam Proposal," Maurice L. Marvin, news.admin.net-abuse.misc, Aug. 3, 1996, 2 pages.
"AOL Instant Messenger Windows Beta Features," Jun. 24, 1999, 2 pages, "AOL Instant Messenger All New Version 2.0," 2 pages, Jun. 24, 1999, "What is AOL Instant Messenger," 3 pages, Jun. 24, 1999, "Quick Tips for Getting Started," 5 pages, Jun. 24, 1999, "Frequently Asked Questions About AOL Instant Messenger," 6 pages, Jun. 24, 1999.
"AOL technology: turning complicated things into a engaging services", 1996 Annual Report, 22 pages.
"Benefits of Active Directory in a Windows 2000 Environment," [online], Sep. 20, 2001 [retrieved on May 13, 2003]. Retrieved from the Internet. <http://www.microsoft.com/windows2000/server/evaluation/business/adwin2k.asp>, pp. 1-9.
"BestCalls.com Announces the BestCalls Technology Index," Business Wire, Jun. 30, 1999, Business Wire, p. 1.
"Better Bayesian Filtering," Paul Graham, Jan. 2003, pp. 1-11, http://www.paulgraham.com/better.html.
"Business at Cyberspeed: Brainstorm Becomes Quick Internet Hit," Walker, Jan. 24, 1999, The Washington Post, p. A.01 (4 total pages).
"CrushParty.com: Help," retrieved Jun. 12, 2002 from the World Wide Web: http://www.crushparty.com/help.jsp, 3 pages.
"Degrees of Separation Email Spam Protection," Halfbakery: Degrees of Separation Email Spam Protection, reprinted from http://halfbakery.com/idea/Degrees_20of_20Seperation_20Email_20Spam_20Protecti . . . printed on Mar. 1, 2004 (3 pages).
"Digital Artifacts for Remembering and Storytelling: Post History and Social Network Fragments," Viegas et al., retrieved from the World Wide Web: http://we.media.mit.edu/~fviegas/papers/posthistory_snf.pdf, 10 total pages.
"Directory Integration Can Lower Total Cost of Ownership and Increase Application Functionality," [online], Jul. 27, 1998 [retrieved on May 13, 2003]. Retrieved from the Internet, <http://www.microsoft.com/presspass/press/1998/Jul98/ActivDPR.asp>, pp. 1 of 4.
"Enterprise Identity Management with Windows 2000 and Active Directory," [online], 1999 [retrieved on May 13, 2003] Retrieved from the Internet <http://www.microsoft.com/technet/prodtechnol/ad/Windows2000/evaluate/w2keims.asp?fra...>, pp. 1-16
"Finding Others Online: Reputation Systems for Social Online Spaces" Jensen et al., Apr. 20-25, 2002, CHI, Minneapolis, Minnesota, vol. 4, Issue 1, pp. 447-454.
"Hottie or Nottie? Web Site Voters Let You Know Whether you Sizzle or Fizzle," Marino, Jul. 11, 2001, Florida Times Union, p. C.1. (2 total pages).
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl+0&adxnnlx=107029 . . . , printed on Nov. 5, 2004 (3 pages).
"Instant Messaging for Gamers," PC Gamer, May 2004, vol. 11, No. 5, p. 28.
"Integrating Applications with Windows 2000 and Active Directory," [online], Oct. 2000[retrieved on May 8, 2003]. Retrieved from the Internet <http://www.microsoft/technet/prodtechnol/ad/windows2000/evaluate/adappstrasp?fra...>, pp. 1-12.
"Integrating Microsoft Metadirectory Services and Active Directory," [online], Aug. 31, 2000 [retrieved on May 13, 2003]. Retrieved from the Internet <http://www.microsoft.com/windows2000/server/evaluation/news/bulletins/mmsma.asp>, p. 1.
"Learning Spam: Simple Techniques for Freely-Available Software," Bart Massey et al. Computer Science Dept., Portland, OR USA, 2003, pp. 1-14.
"Learning to Filter Spam E-Mail: A Comparison of a Naïve Bayesian and a Memory-Based Approach," Ion Adroutsopoulos et al., Univesrity of Athens, Sep. 2000, pp. 1-12.
"Look up contact information from an item," Outlook SR-1 (9.0.0.4527) Help File, on or before Aug. 10, 2001, p. 1.
"Lotus Instant Messaging Everyplace FAQ," retrieved Apr. 29, 2004 from the World Wide Web: http://www.lotus.com/products/product4.nsf/wdocs/249c6f083166cd3e8525d73007144407, pp. 1-3.
"Part I: Active Directory Operations," Active Directory Operations Guide, Microsoft Corporation, Microsoft Windows 2000, Version 1.5, pp. 1-187.
"Part II: Tasks and Procedures Appendices," Active Directory Operations Guide, Microsoft Corporation, Microsoft Windows 2000, Version 1.5, pp. 1-131.
"Plaxo—Update Your Address Book," Plaxo Contact Networks, Reprinted from http://web.archive.org/web/20030218233638/http://www.plaxo.com/ printed on Nov. 5, 2004 (available on Feb. 18, 2003) (1 page).
"Plaxo," Plaxo, reprinted from http://web.archive.org/web/20041105072256/http://www.plaxo.com/ Pprinted on Nov. 5, 2004 (available on Nov. 14, 2004) ( 2pages).
"Reflections on Friendster, Trust and Intimacy," Danah Boyd. Ubicomp 2003, Workshop Application for the Intimate Ubiquitous Computing Workshop. Seattle, WA, Oct. 12-15, 2003.

(56) References Cited

OTHER PUBLICATIONS

"Reputation Systems," Resnick et al., Dec. 2000, Commuications of the ACM, vol. 43, No. 12, pp. 45-48.
"RIM Road: Software: Internet & Netowrk: Webmessenger RIM J2ME/Instant Messaging," retrieved Apr. 29, 2004 from the World Wide Web: http://www.rimroad.com/software/rim1/Webmessenger-RIM-J2ME-Instant-Messaging-20 . . . , pp. 1-4.
"Set up LDAP directory services," Outlook 2000 SR-1 (9.0.0. 4527) Help File, on or before Aug. 10, 2001, p. 1.
"Six Degrees—New Programs Help Companies 'Mine Workers' Relationships for Key Business Prospects," William M. Bulkeley et al., Marketplace, The Wall Street Journal, Aug. 4, 2003, (3 pages).
"Social Nets Find Friends in the VCs," Joanna Glasner, http://www.wired.com/news , Nov. 17, 2003, pp. 1-3.
"Social Network Fragments: An Interactive Tool for Exploring Digital Social Connections." Danah Boyd, Jeff Potter. Sketch at SIGGRAPH 2003. San Diego, California: ACM, Jul. 27-31, 2003.
"Social Networking for Business: Release 0.5," Esther Dyson, Esther Dyson's Monthly Report, vol. 21, No. 10, Nov. 25, 2003, ww.edventure.com, (36 pages).
"Social Networks: Deodorant for the Soul?," Esther Dyson, Esther Dyson's Monthly Report, vol. 21, No. 11, Dec. 12, 2003, www.edventure.com, (36 pages).
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004.
"Socialware: Multiagent Systems for Supporting Network Communities," Hattori et al., Mar. 1999, Association for Computing Machinery, Communications of the ACM, vol. 42, Issue 3, pp. 55 ff.
"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).
"Support Vector Machines for Spam Categorization," Harris Drucker et al., IEEE Transactions on Neural Networks, vol. 10, No. 5, Sep. 1999, pp. 1048-1054.
"Support Vector Machines," Marti Hearst, IEEE Intelligent Systems, Jul./Aug. 1998, pp. 18-28.
"SVM-based Filtering of E-mail Spam with Content-specific Misclasssification Costs," Aleksander Kolcz et al., TextDM'2001 (IEEE ICDM—2001 Workshop on Text Mining), San Jose, CA, 2001, pp. 1-14.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"Technical Solutions for Controlling Spam," Shane Hird, Proceedings of AUUG2002, Melbourne, Sep. 4-6, 2002, 17 pages.
"Technology Journal—Are You Satisfied? eBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat—Instant Messaging is Taking Off, and for Some Users It's Nuzzling Out the Phone," Nick Wingfield, Asian WSJ, Sep. 2000.
"Telstra targets Net spammers," J. Dudley, news.com.au Dec. 2, 2003, 2 pages.
"Text Categorization with Support Vector Machines: Learning with Many Relevant Features," Thorsten Joachims, University of Dortmund, Computer Science Dept., LS-8 Report 23, 1998, 18 pages.
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
"The LP Wireless Messenger," Messenger Documentation, [online]. LP Wireless, Inc., 2001 [retrieved on Nov. 2, 2002]. Retrieved from the Internet <http://www.Ipwireless.com/messengerhelp.htm>, pp. 1-7.
"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.
"Using Active Directory Service," from Chapter 5, Microsoft Windows 2000 Administrator's Pocket Consultant, by William R. Stanek (1999). Retrieved from http://www.microsoft.com/technet/prodtechnol/ad/windows2000/evaluate/05w2kadb.asp?fr . . . , pp. 1-6.
"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).
"What's new about exchanging information over the Internet," Outlook 2000 SR-1 (9.0.0.4527) Help File, on or before Aug. 10, 2001, p. 1.
"Will You Buy a Car From This Man?," Leander Kahney, Oct. 6, 2003, pp. 1-3.
"Windows 2000 Directory Services," [online], [retrieved on May 13, 2003]. Retrieved from the Internet <http://www.microsoft.com/windows2000/technologies/directory/default.asp>, p. 1-2.
"Working with Active Directory Domains", from Chapter 5, Microsoft Windows 2000 Administrator's Pocket Consultant, by William R. Stanek (1999). Retrieved from http://www.microsoft.com/technet/prodtechnol/ad/windows2000/evaluate/05w2kadb.asp?fr . . . pp. 1-10.
"YAHOO! Messenger Makes the World a Little Smaller, More Informed", pp. 1-2, Jun. 21, 1999.
Alan Cohen, "Instant Messaging", Apr. 13, 1999, PC Magazine, PC Labs, 2 pages.
America Online Inc., "AOL Instant Messenger", Aug. 29, 2000, Internet: www.aol.com/aim/.
America Online Inc., "New AIM 4.7", Sep. 27, 2001, Internet: http://aim.aol.com.
Anand Ranganathan et al., "ConChat: A Context-Aware Chat Program", 2002, Pervasive Computing, pp. 51-57.
BuddyGopher—About, available on Jul. 13, 2004, reprinted from http://web.archive.org/web/20040713002836/www.buddygopher.com/about/html on Sep. 28, 2005 (4 pgs).
BuddyGopher—We Love Away Messages!, "BuddyGopher simultaneously checks the away messages of your favorite AIM® buddies.", available on Sep. 24, 2004, reprinted from http://web.archive.org/web/20040924104001/http://www.buddygopher.com/ on Sep. 28, 2005 (2 pgs).
Carlos Jensen et al., "Finding Others Online: Reputation Systems for Social Online Spaces", Apr. 2002, Paper: Group Spaces, pp. 447-454.
CNET Networks Inc., "PopUp Killer", Sep. 13, 2001, Internet: download.cnet.com/downloads/0-10059-100-6932612.html.
International Search Report for International Application No. PCT/US03/15715, mailed Aug. 14, 2003.
International Search Report issued in Application No. PCT/US05/08476, dated Oct. 16, 2009, 11 pages.
International Search Report mailed Aug. 30, 2005 for International Application No. EP03731244.
Supplementary European Search Report isssued in European Application No. EP05728303, dated Jan. 9, 2009, (4 pages).
Courter et al., "Mastering Microsoft Outlook 2000, Premium Edition," Sybex Inc., Alameda, California, 2000, pp. 167-169, ISBN 0-7821-2676-6.
Dodgeball.com: mobile social software, "help: text messaging" available on Oct. 13, 2004 reprinted from http://web.archive.org/web/20041013034241/www.dodgeball.com/social/help_on Sep. 28, 2005 (3 pgs).
Dodgeball.com: mobile social software, "help: the basics", available on Oct. 9, 2004, reprinted from http://web.archive.org/20041009200739/www.dodgeball.com/social/help_basics.php on Sep. 28, 2005 (2 pgs).
Dodgeball.com: mobile social software, "help: use it", available on Oct. 9, 2004, reprinted from http://web.archive.org/web/20041009201853/www.dodgeball.com/social/help_useit.php on Sep. 28, 2005 (2 pgs).
Dodgeball.com: mobile social software, "Hook up with friends. Discover what's around you", available on Nov. 30, 2003, reprinted from

(56) References Cited

OTHER PUBLICATIONS http://web.archive.org/web/20041130034344/www.dodgeball.com/social/index.php on Sep. 28, 2005 (2 pgs).
Ed Bott and Ron Person, Using Windows 95 with Internet Explorer 4.0, Feb. 17, 1998, Que, Special Edition.
Eschenburg, Wo laufen sie denn?, Oct. 26, 1998, pp. 92-95.
Espinoza et al., "GeoNotes: Social and Navigational Aspects of Location-Based Information System", 2001, Ubicomp 2001, LNCS 2201, pp. 2-17.
Examiner's Answer in response to Appeal Brief of U.S. Appl. No. 11/238,129, mailed Jan. 14, 2009, 85 pages.
Flicker Geotagging, <http://www.helio.com/mobile-features/mobile-gps-navigation/flickr-geotagging>, downloaded on Mar. 30, 2009 (1 page).
Home-Tribe.net, http://washingtondc.trib.net/message/24434d1b-817b-4580-aa-42-3bffa15f26a?page=1, retrieved Dec. 13, 2004 (4 total pages).
http://www.friendster.com, retrieved Dec. 13, 2004 (17 pages).
Icq.anywhere, Email Features—Email Center—ICQ.com, retrieved Apr. 29, 2004 from the World Wide Web: http://www.icq.com/email/popular-features.html, pp. 1-5.
International Search Report and Written Opinion dated Feb. 20, 2006, for International Application No. PCT/US05/07204.
International Search Report dated Feb. 4, 2010, for International Application No. PCT/US2009/054886.
International Search Report, Application Serial No. PCT/US05/45663, dated Apr. 11, 2008, 10 pages.
International Search Report, Application Serial No. PCT/US2006/018286, dated Oct. 19, 2006, 12 pages.
J.C. Cannon, "Design Guide for Directory-Enabled Application," [online], Apr. 2001 [retrieved on May 13, 2003]. Retrieved from the Internet <http://msdn.microsoft.com/library/en-us/dnactdir/html/deal.asp?frame=true>, pp. 1-18.
Kohda et al., IMPP: A new Instant Messaging Standard and Its Impact on Internet Business, Dec. 2000, Fujitsu Sci. Tech. J., 36, 2, pp. 147-153.
Mary Beth Marklein, "Students have 'away' with words", Mar. 28, 2004, USA Today, "http://www.usatoday.com/tech/news/2004-03-28-away-messages-usat_x.htm", all pages.
McKendrick, Joesph; "Internet Call Centers: New Era in Customer Service", Feb. 2002; V10. N2, pp. 22(4).
Menkens et al., "IMS Social Network Application With J2ME Compatible Push-to Talk Service," The International Conference on Next Generation Mobile Applications, Services and Technologies, Sep. 12-14, 2007, pp. 70-75.
Microsoft Corporation "Introduction to Active Directory Application Mode," Microsoft Windows Server 2003, Aug. 2002, pp. 1-13.
Microsoft Corporation, "Active Directory Services Interface in the Microsoft Exchange 5.5 Environment," [online], Nov. 1997 [retrieved on May 13, 2003]. Retrieved from the Internet <http://msdn.microsoft.com/library/en-us/dnactdir/html/msdn_asdiexch.asp?frame=true>, pp. 1-12.
Microsoft Corporation, "Comparing Microsoft Active Directory to Novell's NDS," [online], Sep. 1998 [retrieved on May 13, 2003] Retrieved from the Internet <http://msdn.microsoft.com/library/en-us/dnactdir/html/msdn_activedirvsnds.asp?frame=true>, pp. 1-17.
Microsoft Corporation, "Using ADSI, LDAP, and Network Management Functions With Active Directory," [online], Feb. 2002 [retrieved on May 13, 2003]. Retrieved from the Internet <http://msdn.microsoft.com/library/en-us/dnactdir/html/buildingadapps.asp?frame=true>, pp. 1-9.
Mobile Location-Based Services—4th Edition, Table of Contents (2009), http://www.reporterlinker.com/p0126704/Reportlinker-Adds-Mobile-Location-Based-Services-4th-Edition.html (5 pages).
Multi-User Dungeon ("MUD"), <http://en.wikipedia.org/wiki/MUD>, downloaded on Mar. 23, 2009, (9 pages).
Mutton, Paul, "PieSpy Social Network Bot Inferring and Visualizing Social Networks IRC," Dec. 4, 2003, Internet Archive Wayback Machine http://web.archive.org/web/20031204185952/http://jibble.org/piespy, 17 pages.

Neo Mai, Ken Neo. "Buying and selling on the internet; [Computimes, 2* Edition]." New Straits Times. Kuala Lumpur : Jun. 28, 2001. p. 53.
Notice from the European Patent Office dated Oct. 1, 2007 concerning business methods—Journal of the European Patent Office, vol. 30, No. 11 (Nov. 1, 2007) pp. 592-593, XP007905525 ISBN: 0170-9291.
Notification of Transmittal of the International Search Report, International Application No. PCT/US03/36793, dated Apr. 22, 2004, 7 pages.
R. Movva & W. Lai, "MSN Messenger Service 1.0 Protocol", Aug. 1999, Internet Draft, http://tools.ietf.org/id/draft-movva-msn-messenger-protocol-oo.txt, 28 pages.
Reichard, K., "AOL, ICQ to Interoperate—But in a Limited Fashion," Oct. 30, 2002, InstantMessagingPlanet, available at www.instantmessagingplanet.com/public/article/php/1490771.
Ryze home page, www.ryze.com, Dec. 21, 2003, available at http://web.archive.org/web/20031221010006/http://ryze.com, printed Mar. 16, 2005, 13 pages.
Takashi Yoshino et al., "Namba: Location-Aware Collaboration System for Shopping and Meeting", Aug. 2002, IEEE Transactions on Consumer Electronics, pp. 470-477.
VisiblePath webpages, www.visiblepath.org, Dec. 3, 2003 available at http://web.archive.org/web/20031203132211/http://www.visiblepath.com, printed Mar. 16, 2005, 5 pages.
WebmasterWorld.com Inc., "HTML and Browsers", Mar. 5, 2001, Internet: www.webmaster.com/forum21/367.htm.
ZeroDegrees home page, www.zerodgrees.com, Jan. 24, 2004, available at http://web.archive.org/web/20040204153037/www.zerodegrees.com/home.htm, printed Mar. 16, 2005, 2 pages.
U.S. Appl. No. 10/134,437, Feb. 11, 2008, Office Action.
U.S. Appl. No. 10/134,437, Sep. 18, 2008, Office Action.
U.S. Appl. No. 10/134,437, Mar. 10, 2009, Office Action.
U.S. Appl. No. 10/146,814, Dec. 11, 2006, Office Action.
U.S. Appl. No. 10/146,814, Jul. 2, 2007, Office Action.
U.S. Appl. No. 10/184,002, Jan. 9, 2007, Office Action.
U.S. Appl. No. 10/184,002, Jan. 8, 2008, Office Action.
U.S. Appl. No. 10/184,002, Jul. 24, 2008, Notice of Allowance.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/633,636, Oct. 11, 2006, Office Action.
U.S. Appl. No. 10/981,460, Aug. 20, 2008, Office Action.
U.S. Appl. No. 11/015,424, Mar. 19, 2008, Office Action.
U.S. Appl. No. 11/015,424, Nov. 3, 2008, Office Action.
U.S. Appl. No. 11/017,204, Dec. 12, 2007, Office Action.
U.S. Appl. No. 11/017,204, Jun. 23, 2008, Office Action.
U.S. Appl. No. 11/237,718, Apr. 2, 2009, Office Action.
U.S. Appl. No. 11/238,110, Nov. 29, 2007, Office Action.
U.S. Appl. No. 11/238,110, Jul. 9, 2008, Office Action.
U.S. Appl. No. 11/238,110, Oct. 9, 2008, Office Action.
U.S. Appl. No. 11/238,129, Nov. 14, 2007, Office Action.
U.S. Appl. No. 11/238,129, May 28, 2008, Office Action.
U.S. Appl. No. 11/238,130, Jul. 3, 2008, Office Action.
U.S. Appl. No. 11/238,130, Nov. 13, 2008, Office Action.
U.S. Appl. No. 11/238,130, Apr. 14, 2009, Office Action.
U.S. Appl. No. 11/238,130, Nov. 24, 2009, Office Action.
U.S. Appl. No. 11/238,130, Mar. 15, 2010, Notice of Allowance.
U.S. Appl. No. 12/581,669, Jun. 29, 2010, Notice of Allowance.
U.S. Appl. No. 12/815,847, Jul. 21, 2011, Office Action.
U.S. Appl. No. 12/815,847, Nov. 9, 2011, Office Action.
U.S. Appl. No. 12/815,847, Apr. 27, 2012, Office Action.
U.S. Appl. No. 12/815,847, Sep. 18, 2013, Office Action.
U.S. Appl. No. 12/815,847, Dec. 6, 2013, Notice of Allowance.
U.S. Appl. No. 12/815,847, Feb. 13, 2014, Notice of Allowance.
U.S. Appl. No. 12/986,121, Feb. 1, 2013, Office Action.
U.S. Appl. No. 12/986,121, Sep. 3, 2013, Notice of Allowance.
U.S. Appl. No. 12/986,121, Dec. 5, 2013, Notice of Allowance.
U.S. Appl. No. 13/615,182, Feb. 22, 2013, Office Action.

(56) References Cited

OTHER PUBLICATIONS

U.S. Appl. No. 13/615,182, Jun. 6, 2013, Office Action.
U.S. Appl. No. 13/615,182, Oct. 25, 2013, Office Action.
U.S. Appl. No. 13/615,182, Mar. 20, 2014, Office Action.
U.S. Appl. No. 13/615,182, Nov. 4, 2014, Office Action.
U.S. Appl. No. 13/615,198, Feb. 22, 2013, Office Action.
U.S. Appl. No. 13/615,198, Jun. 10, 2013, Office Action.
U.S. Appl. No. 13/615,198, Oct. 28, 2013, Office Action.
U.S. Appl. No. 13/615,198, Mar. 20, 2014, Office Action.
U.S. Appl. No. 13/615,198, Nov. 3, 2014, Office Action.
U.S. Appl. No. 13/615,207, Mar. 1, 2013, Office Action.
U.S. Appl. No. 13/615,207, Jun. 10, 2013, Office Action.
U.S. Appl. No. 13/615,207, Oct. 28, 2013, Office Action.
U.S. Appl. No. 13/615,207, Mar. 21, 2014, Office Action.
U.S. Appl. No. 13/615,207, Oct. 21, 2014, Office Action.
U.S. Appl. No. 13/615,246, Sep. 13, 2013, Office Action.
U.S. Appl. No. 13/615,246, Feb. 19, 2014, Notice of Allowance.
U.S. Appl. No. 13/615,254, Sep. 13, 2013, Office Action.
U.S. Appl. No. 13/615,254, Feb. 20, 2014, Notice of Allowance.
U.S. Appl. No. 13/615,263, Sep. 19, 2013, Office Action.
U.S. Appl. No. 13/615,263, Feb. 24, 2014, Office Action.
U.S. Appl. No. 13/615,263, Jun. 10, 2014, Notice of Allowance.
U.S. Appl. No. 13/768,440, Jul. 19, 2013, Office Action.
U.S. Appl. No. 13/768,440, Mar. 28, 2014, Notice of Allowance.
U.S. Appl. No. 13/768,440, Apr. 23, 2014, Notice of Allowance.
U.S. Appl. No. 13/783,597, Nov. 13, 2013, Office Action.
U.S. Appl. No. 13/783,946, Nov. 14, 2013, Office Action.
U.S. Appl. No. 13/783,946, Mar. 18, 2014, Office Action.
U.S. Appl. No. 13/783,946, Oct. 20, 2014, Office Action.
U.S. Appl. No. 13/794,482, Sep. 19, 2013, Office Action.
U.S. Appl. No. 13/794,482, Feb. 27, 2014, Office Action.
U.S. Appl. No. 13/794,482, Jul. 8, 2014, Notice of Allowance.
U.S. Appl. No. 13/615,182, Mar. 31, 2015, Office Action.
U.S. Appl. No. 13/615,198, Mar. 6, 2015, Office Action.
U.S. Appl. No. 13/615,207, Mar. 5, 2015, Notice of Allowance.
U.S. Appl. No. 13/783,946, Mar. 4, 2015, Office Action.
U.S. Appl. No. 14/508,632, May 7, 2015, Office Action.
U.S. Appl. No. 14/510,422, Apr. 24, 2015, Office Action.
U.S. Appl. No. 13/783,946, Jul. 22, 2015, Notice of Allowance.
U.S. Appl. No. 14/508,632, Aug. 3, 2015, Notice of Allowance.
U.S. Appl. No. 14/510,422, Aug. 4, 2015, Notice of Allowance.

PROVIDING A LOCATION IDENTIFIER FOR A LOCATION WITH MULTIPLE CO-USERS

CROSS-REFERENCE TO RELATED APPLICATIONS

This application is a continuation of U.S. application Ser. No. 13/794,482 filed on Mar. 11, 2013, which is now allowed, which is a continuation of U.S. application Ser. No. 13/768,440 filed on Feb. 15, 2013 and now issued as U.S. Pat. No. 8,787,940, which is a continuation of U.S. application Ser. No. 12/986,121 filed on Jan. 6, 2011 and now issued as U.S. Pat. No. 8,712,431, which is a divisional application of U.S. application Ser. No. 12/581,669 filed on Oct. 19, 2009 and now issued as U.S. Pat. No. 7,890,123, which is a divisional application of U.S. patent Ser. No. 11/238,110 filed on Sep. 29, 2005 and now issued as U.S. Pat. No. 7,606,580, which claims the benefit of priority to: U.S. Provisional Application Ser. No. 60/679,652, titled "Processing Information Describing Electronic Messaging Users," and filed May 11, 2005, and U.S. Provisional Application Ser. No. 60/710,616, titled "Personalized Location Information for Mobile Devices," and filed Aug. 24, 2005. This application is related to U.S. patent application Ser. No. 11/238,129 filed on Sep. 29, 2005, and titled "Searching Electronic Content in Instant-Messaging Applications" and now U.S. Pat. No. 7,814,100 and U.S. patent application Ser. No. 11/238,130 filed on Sep. 29, 2005 titled "Identifying Users Sharing Common Characteristics," and now U.S. Pat. No. 7,765,265. The entire contents of all of the above applications are hereby incorporated by reference in their entirety.

TECHNICAL FIELD

This application relates to the personalization of location information for mobile devices.

BACKGROUND

In instant-messaging applications, users may communicate with each other by exchanging instant messages. An individual user may have a buddy list that includes the names of other users, known as "buddies," with whom the user may communicate regularly. The user may send instant messages to any of the buddies, as well as other users not included in the buddy list, that are logged on to their respective computing stations. Any one of these buddies may store electronic content that can be shared with other users. For example, a buddy may store an "away" message that can be provided as an auto-response to other users to indicate that the buddy is presently away from his or her computing station or is otherwise unavailable to send and receive instant messages.

Away messages can serve several purposes. Many people use them to let others, such as their buddies, know exactly where they are. Others use away messages to provide creative expression, such as by publishing the lyrics of the song they just wrote or a funny quote they just heard in a movie. Recent studies have shown that individuals of certain age groups (such as college-aged adults) not only invest a fair amount of time creating multiple away messages per day, but they also spend a great deal of time reading the away messages of their buddies.

A very common use of away messages is to post your current location or activity so that buddies can easily keep track of where you are and be informed enough to join in your activity if they are up to it. Users often trust this service as a place to keep their personal information, such as contact information, so their friends can get in touch with them at any time. They use it to share information such as links to pictures, web logs (blogs), funny articles, declarations of love to a boyfriend/girlfriend, a countdown until the day they graduate, and other things of value. It is a quick way to provide a glimpse into the user's life and, in most cases, it also may provide a way to get more information about the user if a buddy wants to spend the time to do so.

SUMMARY

In one general aspect, providing location information on a mobile device includes receiving signals from external devices. Each signal includes information that specifies a geographic location for the external device that has provided the signal. A geographic location for the mobile device is calculated by using the information contained in each of the received signals. A representation of the geographic location of the mobile device is generated. The representation of the geographic location is included within an electronic message that provides information describing a user of the mobile device to other users of an electronic communications system. The electronic message is transmitted to another device to provide an indication of the geographic location for the user to one of the other users of the electronic communications system.

Implementations may include one or more of the following features. For example, generating a representation of the geographic location may include generating a representation of a location that is within a threshold distance from the calculated geographic location. Generating a representation of the geographic location also may include identifying a name of the geographic location. Identifying a name of the geographic location may include accessing a data store that includes indications of names of geographic locations.

Generating a representation of the geographic location may include prompting the user of the mobile device for the representation of the geographic location. Generating a representation of the geographic location also may include generating a commercial or social description of the geographic location.

Receiving signals from external devices may include receiving signals from one or more GPS satellites. Each signal received from an external device may include information that specifies a previous electronic message that provides information describing the user.

Including the representation of the geographic location within the electronic message may include overwriting a representation of a previous geographical location of the mobile device with the generated representation of the mobile device.

The generated representation of the geographic location may be stored such that the representation may be used without being generated again at a later time when the mobile device is at the geographic location. The user of the mobile device may be prompted to select the generated representation of the geographic location for inclusion in the electronic message at a next time at which the mobile device is located at the geographic location.

The user of the mobile device may be prompted to confirm that the representation of the geographic location should be included in the electronic message. Prompting the user may include prompting the user when the geographic location is more than a threshold distance away from a previous geographic location, or prompting the user when the geographic location has not changed for more than a threshold amount of time.

Calculating the geographic location may include calculating a latitude, a longitude, or an altitude of the geographic location. Calculating the geographic location may include calculating the geographic location in response to a user request.

The electronic message may indicate the availability of the user to send and receive electronic messages. The electronic message may include text, audio data, video data, or graphical data.

The mobile device may be at least one from a group including a personal computer, a mobile phone, and a personal digital assistant.

Including the representation of the geographic location within an electronic message may include identifying an electronic message based on the representation of the geographic location, or generating an electronic message based on the representation of the geographic location.

A determination may be made as to whether the geographic location is a geographic location for which the representation of the geographic location should be included in the electronic message. Including the representation of the geographic location in the electronic message may include including the representation of the geographic location in the electronic message when the geographic location is a geographic location for which the representation of the geographic location should be included in the electronic message.

The details of one or more implementations are set forth in the accompanying drawings and the description below. Other features, objects, and advantages will be apparent from the description and drawings, and from the claims.

DETAILED DESCRIPTION

Electronic content stored in association with a user is updated automatically with an indication of a location of the user. A mobile device used by the user identifies a location of the mobile device, which is assumed to be the location of the user. The user may be made able to name or otherwise identify the location identified by the mobile device. The mobile device stores an indication of the location within the user's electronic content such that the indication of the location is provided to other users that request and receive the electronic content. As the location of the user and the mobile device changes, new locations are identified and stored within the electronic content such that accurate indications of the location of the user are provided. Each time the location of the mobile device changes, or periodically, the user may be notified and asked to confirm that the location is correct and should be included in the electronic content.

Figure 1:
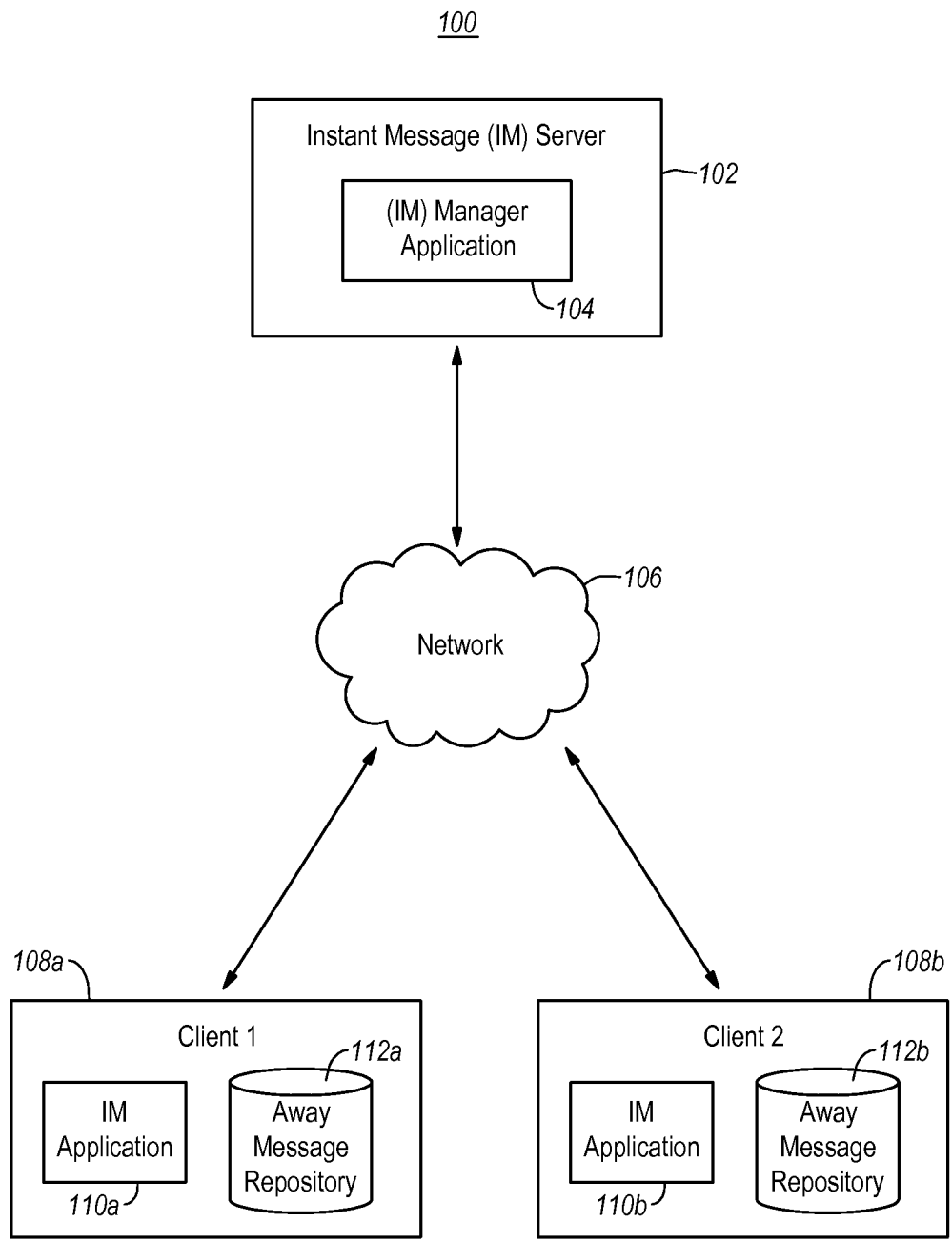
FIG. 1 is a block diagram of a networking system that is used for communication of electronic messages.

FIG. 1 is a block diagram of a networking system 100 that is used for transmission of instant messages, according to one implementation. In this implementation, the system 100 includes an instant message (IM) server 102, a network 106, and client devices 108a and 108b. The IM server 102 is coupled to both the client device 108a and the client device 108b through the network 106. The network 106 is a wide-area network (WAN) in some implementations, and a local-area network (LAN) in others. The client devices 108a and 108b may each include a computing device, such as the computing device shown in FIG. 11. In certain implementations, the client devices 108a and 108b may be mobile devices, such as portable computers, cellular telephones, or personal digital assistants (PDAs).

During operation, the client device 108a may initiate an instant-messaging session with the client device 108b and send one or more IMs to the client device 108b during the instant-messaging session. To do so, the client device 108a invokes an IM application 110a. In one implementation, a first user manually invokes the IM application 110a. In another implementation, the client device 108a automatically invokes the IM application 110a at start-up. The client device 108a also may include various other applications that operate at run-time, such as word-processing applications, web-browser applications, or mail applications. When a first user on the client device 108a wishes to begin an instant-messaging session with a second user on the client device 108b, the first user initiates a request. This request includes an address associated with the client device 108b. The IM application 110a on the client device 108a sends this request to an IM manager application 104 on the IM server 102 using the network 106.

Upon receipt of this request from the client device 108a, the IM manager application 104 uses the address contained within the request to locate the client device 108b. The IM manager application 104 then routes the request to an IM application 110b on the client device 108b using the network 106. The IM application 110b then processes this request and initiates a new instant-messaging session with the IM application 110a on the client device 108a. The second user on the client device 108b is then notified by the IM application 110b of the new session, and the first and second users of the client devices 108a and 108b are capable of exchanging IMs during the course of the instant-messaging session. The client device 108b also may contain other applications, such as word-processing applications, web-browser applications, or mail applications.

In one implementation, the client device 108a is capable of sending messages to and receiving messages from the client device 108b through the network 106 without the use of the IM server 102. In this implementation, the IM applications 110a and 110b manage all of the IM functionality on the client devices 108a and 108b, respectively. Each of the IM applications 110a and 110b is capable of authenticating and locating other client devices to enable the exchange of messages to and from the client devices 108a and 108b, respectively.

The client devices 108a and 108b include away message repositories 112a and 112b. The away message repository 112a includes one or more away messages that have been specified by a user of the client device 108a. Each of the away messages may include information describing the user. For example, an away message may include an indication of a current location or activity of the user. In addition, the away message may include an indication of the availability of the user to send and receive instant messages. Furthermore, the away message may be identifiable by a title that may be considered to be part of the away message. In one implementation, the away message may include a profile of the user. The away messages included in the away message repositories 112a and 112b may include audio data, video data, graphical data, emoticons, and/or text.

The away message repositories 112a and 112b may include multiple types of away messages. For example, the repositories 112a and 112b may include online away messages for a user that are provided when the user is available to send and receive electronic messages. Similarly, the repositories 112a and 112b may include offline away messages for a user, which are away messages that are provided when the user is not available to send and receive electronic messages. The repositories also may include profiles that include information describing the user. Location away messages, which specify only user location, and mobile away messages, which are used when the client devices 112a and 112b are mobile devices, also may be stored within the repositories 112a and 112b.

The user of the client device 108a may make one of the away messages stored in the away message repository 112a accessible to the client device 108b such that the away message may be transferred to the client device 108b for processing or for presentation to a user of the client device 108b. The user of the client device 108a may select one of the away messages from the away message repository 112a based on the information included in the away message. If none of the stored away messages include desirable information, then the user may specify a new away message including the desirable information for storage in the repository 112a. In some implementations, the user of the client device 108a may make multiple away messages included in the repository 112a accessible for transfer to the client device 108b and other client devices. The away message that is provided to the other client device may depend on an identity of a user of the other client device. For example, a first away message may be provided when the user of the other client device is a mother of the user of the client device 108a, and a second away message may be provided when the user of the other client device is a friend of the user of the client device 108a.

In one implementation, the away message repositories 112a and 112b may include old away messages that are no longer applicable to the corresponding users. For example, when the user of the client system 108a modifies an original away message, the away message repository 112a may maintain a copy of the original away message as well as the modified away message. The old away messages may be made accessible, for example, in the form of a web log (e.g., blog) such that more than just a most recent away message is accessible. Consequently, other users or systems that access the web log may be provided with indications of previous events, activities, locations, or characteristics of the user, as well as indications of more recent events, activities, locations, or characteristics of the user.

In some implementations, the IM application 110a or the IM application 110b may be configured to respond automatically to instant messages received at the client devices 108a and 108b. In addition, the IM applications 110a and 110b may be configured to perform some function identified by the received instant messages. For example, the client device 108a may represent a mobile device used by a user, and the client device 108b may be a desktop computer used by the user. In such a case, the mobile device may not include the away message repository 112a, due to limited storage and processing capabilities. Instead, away messages for the user may be provided from the away message repository 112b included in the desktop computer. The user may send an instant message from the mobile device to the desktop computer identifying an away message included in the away message repository 112b to be made available to other users. The automatic response to the received instant message may indicate that the identified away message has been made available to the other users.

In some implementations, the users of the client devices 108a and 108b may specify user information feeds that periodically provide to other users information relating to the users. Alternatively or additionally, the IM server 102 may be configured to aggregate the information relating to the users into the user information feeds on behalf of the users. The user information feed for a user may include any information related to the user, such as entries included in an online journal of the user, an away message of the user, a profile of the user, media files of interest to the user, a playlist specifying an order in which the user listens to or watches the media files, recent communications sent and received by the user, and RSS feeds of interest to the user. The client devices 108a and 108b or the IM server 102 may periodically provide the user information feeds to other users who have subscribed to the information feeds. Alternatively or additionally, the client devices 108a and 108b or the IM server 102 may provide only portions of a user information feed that have been added or changed since a previous distribution of the user information feed.

Figure 2:
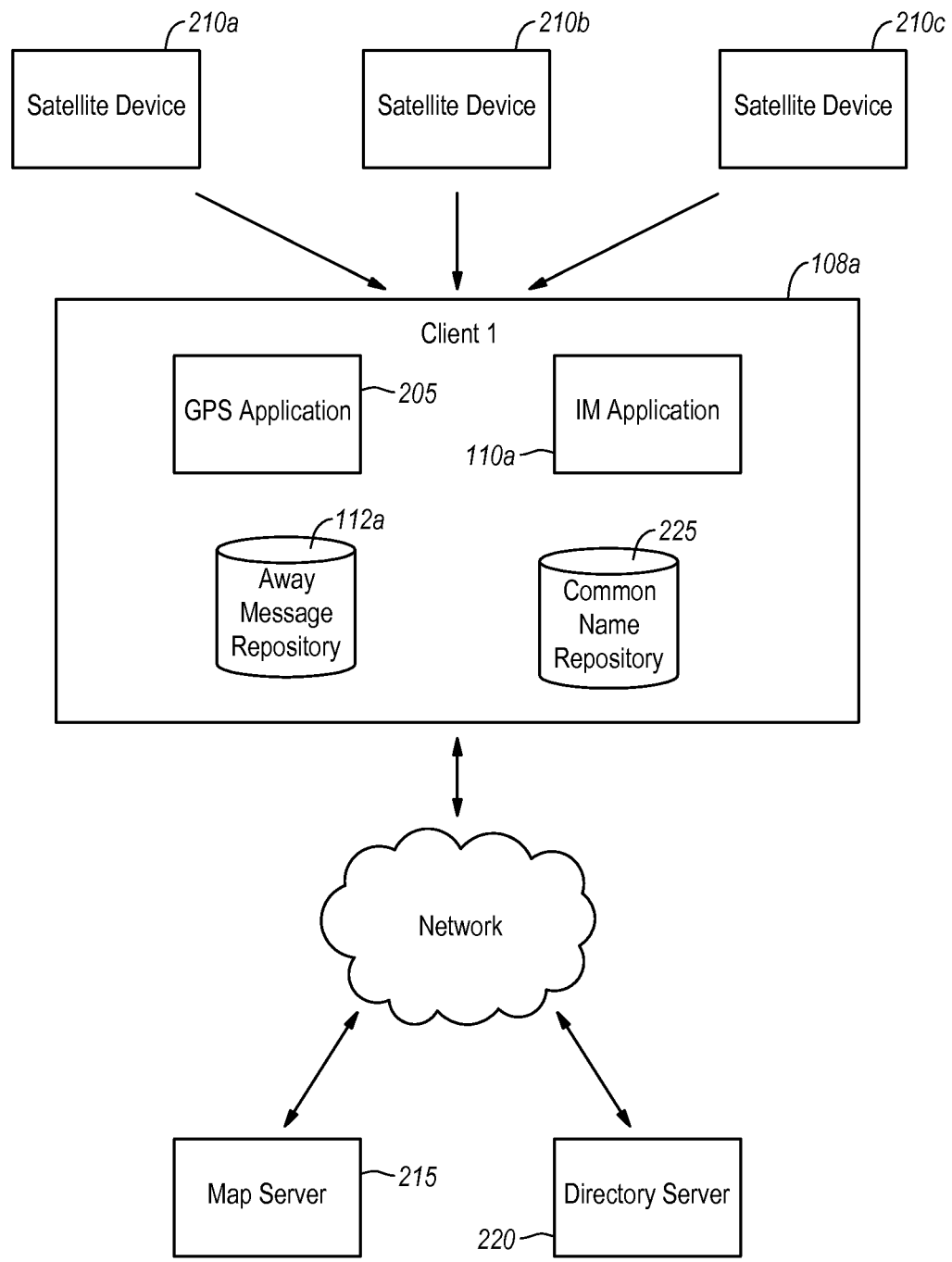
FIG. 2 is a block diagram of a system for identifying a location of a mobile computing device.

Referring to FIG. 2, a system 200 is used to identify a geographic location of a client system 108a for use with an IM application 110a. A GPS application 205 of the client system 108a communicates with satellite devices 210a-210c to identify a location of the client system 108a. The client system 108a also may communicate with a map server 215 and a directory server 220 through a network 106. The client system 108a also includes an away message repository 112a and a common name repository 225. The network 106, the client system 108a, the IM application 110a, and the away message repository 112a are similar to corresponding components from FIG. 1.

The GPS application 205 is configured to determine a location of the client system 108a. The GPS application 205 may include a GPS receiver and a location determination module. The GPS receiver is configured to communicate with the satellite devices 210a-210c. Based on the signals received from the satellite devices 210a-210c, the location determination module calculates a distance to each of the satellite devices 210a-210c. The location determination module then may determine the location of the client system 108a based on the calculated distances to the satellite devices 210a-210c. The GPS application 205 may determine the location of the client system 108a as latitude and longitude coordinates, which are also known as GPS coordinates.

The map server 215 provides addresses or other representations of locations identified by the GPS application 205. For example, the GPS application 205 may provide the map server 215 with the latitude and longitude coordinates identifying the location of the client system 108a. In response, the map server may identify an address, a name, or another representation of the location of the client system 108a. In some implementations, the functionality provided by the map server 215 may be included in the GPS application 205.

The directory server 220 also provides information about the location of the client system 108*a*. More particularly given GPS coordinates or an address from the GPS application 205 or the map server 215, the directory server 220 may provide a name of the location. For example, if the client system 108*a* is located at a business, the directory server 220 may provide a name of the business in response to the address. As another example, if the client system 108*a* is located at a residence, the directory server 220 may provide the name of a person that lives at the residence. In some implementations, the directory server also may be configured to provide additional information describing the location, such as a phone number of the location. In some implementations, the functionality provided by the directory server 220 may be included in the GPS application 205.

The common name repository 225 stores alternative representations of the locations of the client system 108*a* that were identified by the GPS application 110. For example, the common name repository 225 may store names and other information describing the locations that were provided by the map server 215 or the directory server 220, or by a user of the client system 108*a*. The stored names and descriptive information for the previous locations may be used when the client system 108*a* is subsequently located at one of the previous locations without having to identify the name or descriptive information again.

Figure 3:
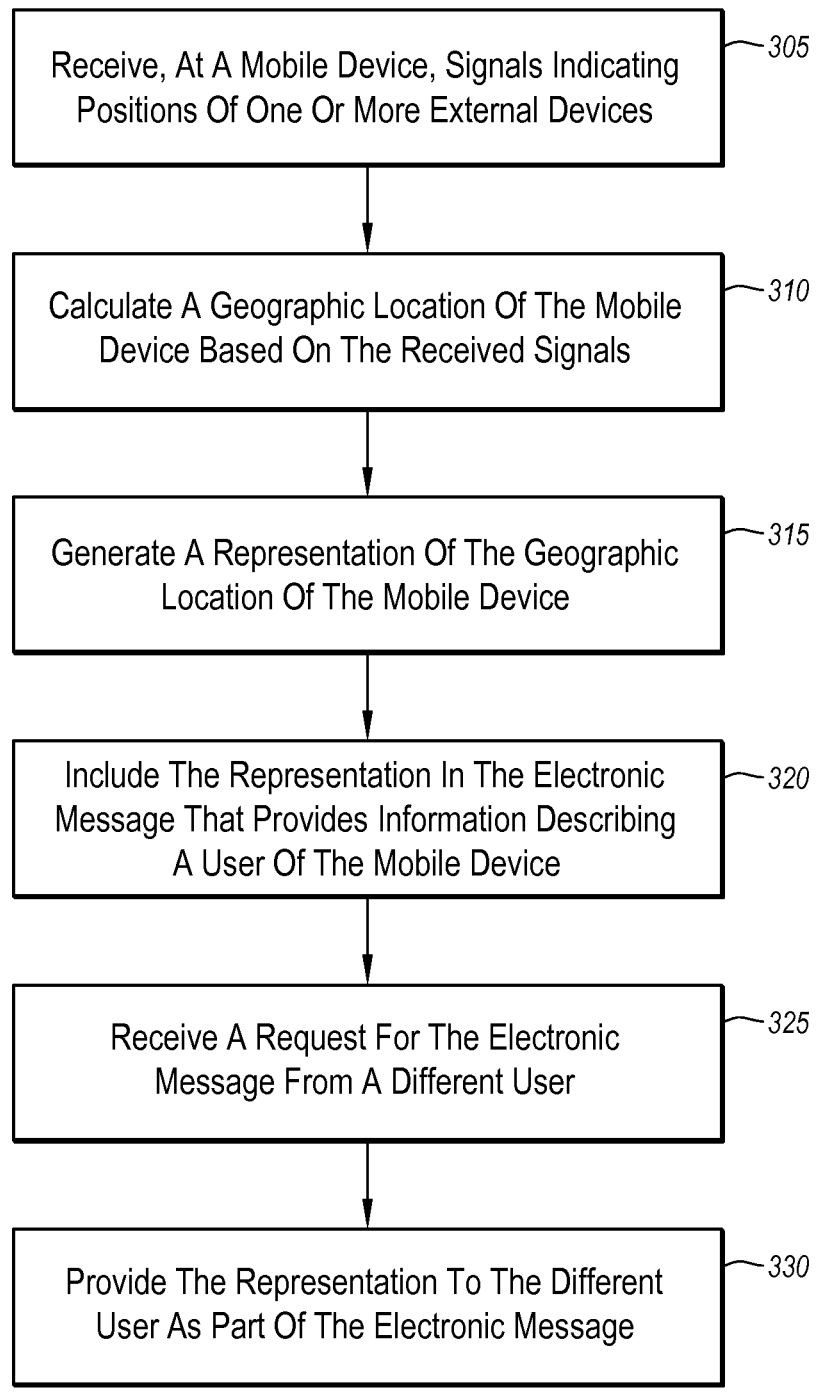
FIG. 3 is a flow chart of a process for updating electronic content stored in association with a user with information describing a location of the user.

Referring to FIG. 3, a process 300 is used to identify and provide an indication of a location of a user based on a location of a mobile device used by the user. The process 300 may be executed by a mobile device, such as implementations of the client device 108*a* of FIGS. 1 and 2 that are mobile devices.

The mobile device first receives signals indicating positions of one or more external devices (305). For example, the mobile device may receive signals indicating the position of the satellite devices 215*a*-215*c* of FIG. 2. More particularly, a GPS application of the mobile device, such as the GPS application 205 of FIG. 2, may receive the signals. Alternatively or additionally, the mobile device may receive the signals from other systems with which the mobile device communicates, such as cellular telephone towers. The signals also may indicate an address of the mobile device, such as an Internet Protocol (IP) address of the mobile device. The mobile device calculates a geographic location of the mobile device based on the received signals (310). More particularly, the GPS application may calculate the geographic location of the mobile device based on the received signals. Calculating the geographic location may include calculating a latitude measurement, a longitude measurement, and/or an altitude measurement for the geographic location. The mobile device may use triangulation to calculate the position based on the signals received from the satellite devices 215*a*-215*c* or the cellular telephone towers.

The mobile device may generate a representation of the geographic location of the mobile device (315). Alternatively, the mobile device may generate a representation of a location that is within a threshold distance from the geographic location. For example, if the mobile device is located in a parking lot of a business, the mobile device may generate a representation of the business instead of the parking lot if the business is within the threshold distance from the parking lot. The representation may be a name or another commercial or social description of the geographic location. For example, the representation of a business named "Bill's Bar" on Lake Street may be "Bill's," "the bar," "Bill's pub," "Bill's on Lake," or another variation of the name and location of the business. The representation of the geographic location also may include an indication of the geographic location itself. For example, a representation of a geographic location may include "Bill's Bar at 13 Lake Street," in which case "Bill's Bar" is the representation of the geographic location, which is "13 Lake Street."

In one implementation, the mobile device may contact a map server, such as the map server 215 of FIG. 2, or a directory server, such as the directory server 220 of FIG. 2, to identify the representation of the geographic location. For example, the mobile device may provide an indication of the geographic location to the map server or the directory server, and the map server of the directory server may generate and provide the representation of the geographic location to the mobile device in response.

In another implementation, the mobile device prompts a user of the mobile device for a representation of the geographic location. For example, a user interface displayed on the mobile device may include an indication of the geographic location that was identified by the mobile device, the map server, or the directory server. The user may use the user interface to specify the representation of the indicated geographic location. The mobile device may store a representation of the geographic location for later use when the mobile device returns the geographic location.

In another implementation, the mobile device may identify the representation automatically and may prompt the user for confirmation of the automatically identified representation. The mobile device may prompt the user for confirmation, for example, if the mobile device determines that the geographic location of the mobile device has changed substantially (e.g., by more than a threshold distance), or if the geographic location has not changed for longer than a threshold amount of time.

The mobile device includes the representation in an electronic message that provides information describing the user of the mobile device (320). For example, the mobile device may include the representation of the geographic location in an away message of the user. The away message may be stored in an away message repository that is local to the mobile device, such as the away message repository 112*a* of FIGS. 1 and 2. Alternatively, the away message may be stored at an IM server through which the user communicates with other users. If the electronic message already includes a representation of a previous geographic location of the mobile device, the mobile device may overwrite the representation of the previous geographic location with the newly identified geographic representation. If the representation of the geographic location includes an indication of the geographic location itself, the representation and the geographic location may be included in different parts of the electronic message.

In some implementations, the user of the mobile device may maintain multiple electronic messages, and each electronic message may be made available to only a subset of other users. For example, the user may maintain a first electronic message that is provided to family members and a second electronic message that is provided to friends. In such a case, the representation of the geographic location may be included in only a subset of the electronic messages. For example, if the user is located at a bar, the representation of the geographic location may be included only in the second electronic message that is provided to friends of the user. Alternatively or additionally, multiple representations of the geographic location may be generated for inclusion in particular ones of the electronic messages. For example, a first representation indicating that the user is "out with friends" may be generated for inclusion in the first electronic message, and another representation indicating that the user is "at the bar" may be generated for inclusion in the second electronic message.

The mobile device then receives a request for the electronic message from a different user (325). For example, the mobile device receives the request from a client system used by the different user, such as the client system 108b of FIG. 1. In response to the received request, the mobile device provides the representation of the geographic location to the different user as part of the electronic message (330). The mobile device may provide the electronic message from the local away message repository, or from the IM server. For example, the mobile device may provide the electronic message to the different user directly. Alternatively, the mobile device may request that the IM server provide the electronic message to the different user. As a result, the different user is made aware of the geographic location of the user of the mobile device.

In one implementation, a server side process, such as a process running on the IM server 102 of FIG. 1, receives GPS coordinates or another indication of the location of the mobile device from the mobile device. The server side process identifies a common name (e.g. Starbucks on 9th and M, or RFK stadium, or "GMU computer lab") based on the indicated location received from the mobile device, for example, using the map server 215, the directory server 220, or the common name repository 225 of FIG. 2, as described above. The server side process may make the common name available in away messages, participant lists, or the common name repository 225 for access by other users. This common name location information can also be used for purposes of grouping by location, searching by location, or other location-based activities.

The process 300 may be executed by the mobile device multiple times. For example, the mobile device may periodically determine the location of the mobile device (305, 310). If the location has changed substantially from a previously determined location, then the electronic message of the user of the mobile device may need to be updated. Consequently, the mobile device may complete execution of the process 300 to update the electronic message and to provide the electronic message to other users after the electronic message has been updated. Even if the location of the mobile device has changed, the user may be prompted before the electronic message is updated, in case that the user does not desire to update the electronic message, for example, because the user anticipates that the location of the mobile device will change again soon.

Furthermore, the user may be enabled to indicate when the process 300 should be executed. For example, the user may be enabled to manually request execution of the process 300. Alternatively or additionally, the user may be enabled to specify a set of locations in which the electronic message of the user should be updated with the location of the user. The mobile device may begin execution of the process 300 periodically to determine its location. If the location of the mobile device matches one of the previously specified locations, then execution of the process 300 completes to update the electronic message describing the user.

Some implementations of the process 300 may be executed by an IM server, such as the IM server 102 of FIG. 1. In such implementations, rather than identifying the geographic location of the mobile device, the IM server simply receives the location from the mobile device. The IM server may generate the representation of the geographic location locally (315), or the IM server may receive the representation from the mobile device. The IM server then includes the representation in the electronic message describing the user of the mobile device (320). The IM server may receive a request for the electronic message (325) and may provide the representation as part of the electronic message (330). The IM server may access and provide the electronic message from the away message repository of the mobile device, or from a local copy of the electronic message.

Other implementations of the process 300 may not include the representation of the geographic location in the electronic message describing the user of mobile device (320). Instead, the representation of the geographic location may be used to identify an appropriate electronic message from a set of previously specified electronic messages. The appropriate electronic message may not explicitly indicate the geographic location of the mobile device. However, the electronic message is only an appropriate description of the user when the mobile device is at the geographic location. For example, the representation of the geographic location may indicate that the mobile device is at a workplace of the user. Consequently, an electronic message that includes the text "earning my paycheck" may be identified as an appropriate description of the user, based on the geographic location.

Alternatively or additionally, the appropriate electronic message may be generated automatically based on the representation of the geographic location. The automatically generated electronic message may include audio data, video data, graphical data, emoticons, or text. For example, if the representation of the geographic location indicates that the user is at his gym, an electronic message including a video of a person running, a picture of a barbell, and the text "feeling the burn" may be generated. The automatically generated electronic message may be stored for later use in an away message repository corresponding to the mobile device, such as one of the away message repositories 112a or 112b of FIG. 1.

Figure 4:
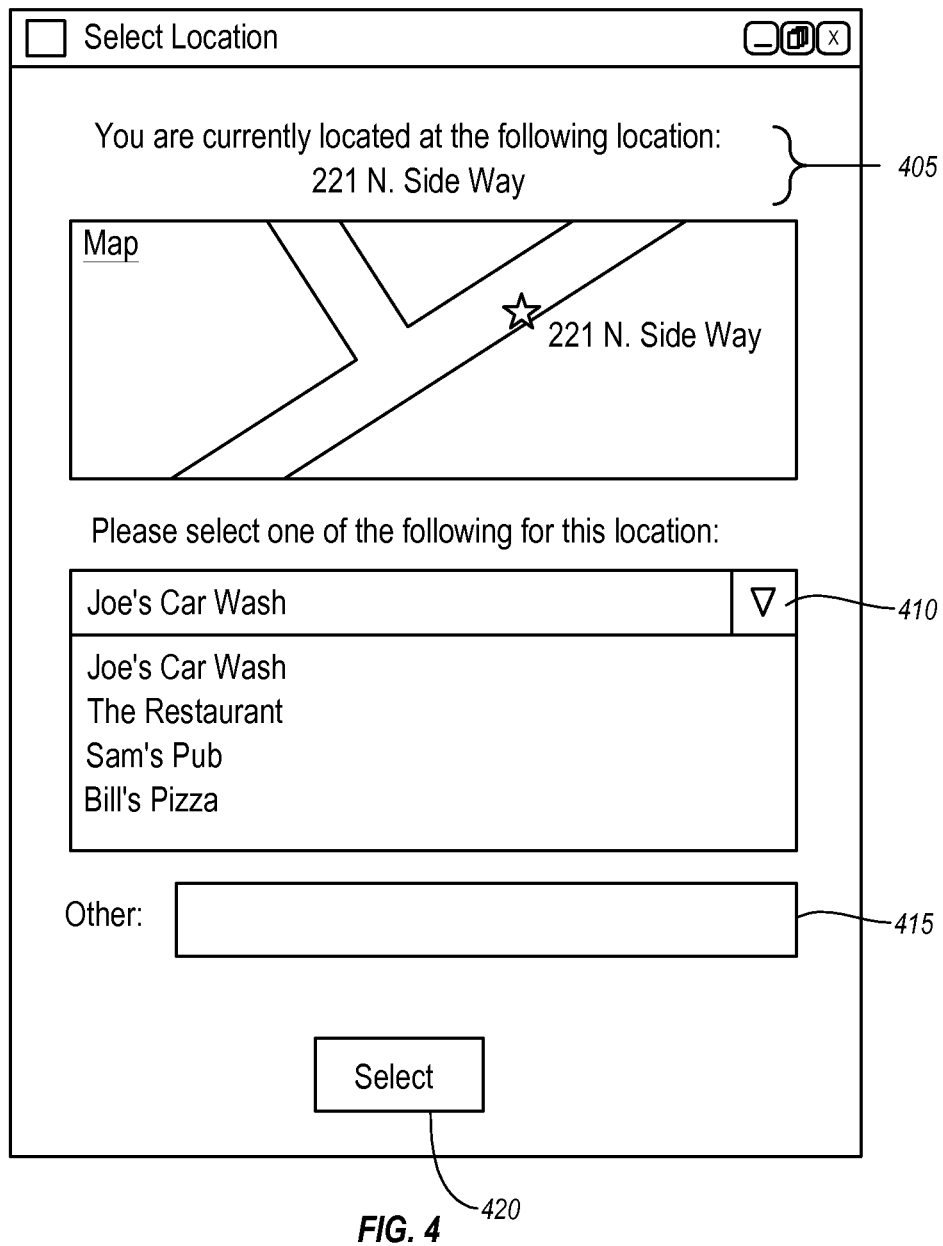
FIG. 4 is an illustration of an interface for specifying a location of a mobile computing device.

Referring to FIG. 4, an interface 400 enables a user of a mobile device to generate a representation of an otherwise automatically identified geographic location of the mobile device. The interface 400 may be presented on the mobile device during execution of the process 300 of FIG. 3. The interface includes a geographic location indicator 405, a selection list 410 and a text box 415 with which the representation may be specified, and a button 420 for selecting the specified option.

The geographic location indicator 405 provides an indication of a geographic location of the mobile device. The indicated geographic location may be calculated by a GPS application of the mobile device, as described above with respect to operations 305 and 310 of the process 300 of FIG. 3. Alternatively or additionally, the mobile device may access a map server or a directory server to identify the indicated geographic location, as described above with respect to operation 315 of the process 300 of FIG. 3. For example, in the illustrated implementation, the geographic location indicator 405 includes an address that was identified by the map server in response to GPS coordinates provided by the mobile device.

The selection box 410 enables the user of the interface 400 to select the representation of the indicated geographic location from among a set of representations of previous geographic locations of the mobile device. The representations that are selectable from the selection box 410 may have been saved after being generated when the mobile device was located at the previous geographic locations. In one implementation, if a representation of the geographic location indicated by the geographic location indicator has been identified and saved previously, then that representation may be presented as a default value for the selection box 410. The options included in the selection box 410 may represent text, audio data, video data, or graphical data.

If a representation corresponding to the indicated geographic location is not included as a selectable option of the selection box 410, the user may specify the representation manually using the text field 415. Alternatively or additionally, the text field 415 may be used to identify a non-textual representation of the indicated geographic location. For example, the text field 415 may be used to specify a location of an image file, an audio file, or a video file that is to serve as the representation of the indicated geographic location.

Selecting the button 420 associates the representation specified by the selection box 410 or the text field 415 with the geographic location indicated by the geographic location indicator 405. In one implementation, if no text is specified in the text field 415, and no option is selected from the selection box 410, then selecting the button 420 sets the indicated geographic location as its own representation. In another implementation, the indicated geographic location may be included as part of the representation of the geographic location. In some implementations, the specified representation may be stored in association with the indicated geographic location for use when the mobile device returns to the indicated geographic location. In some implementations, selecting the button 420 also may dismiss the interface 400.

Figure 5:
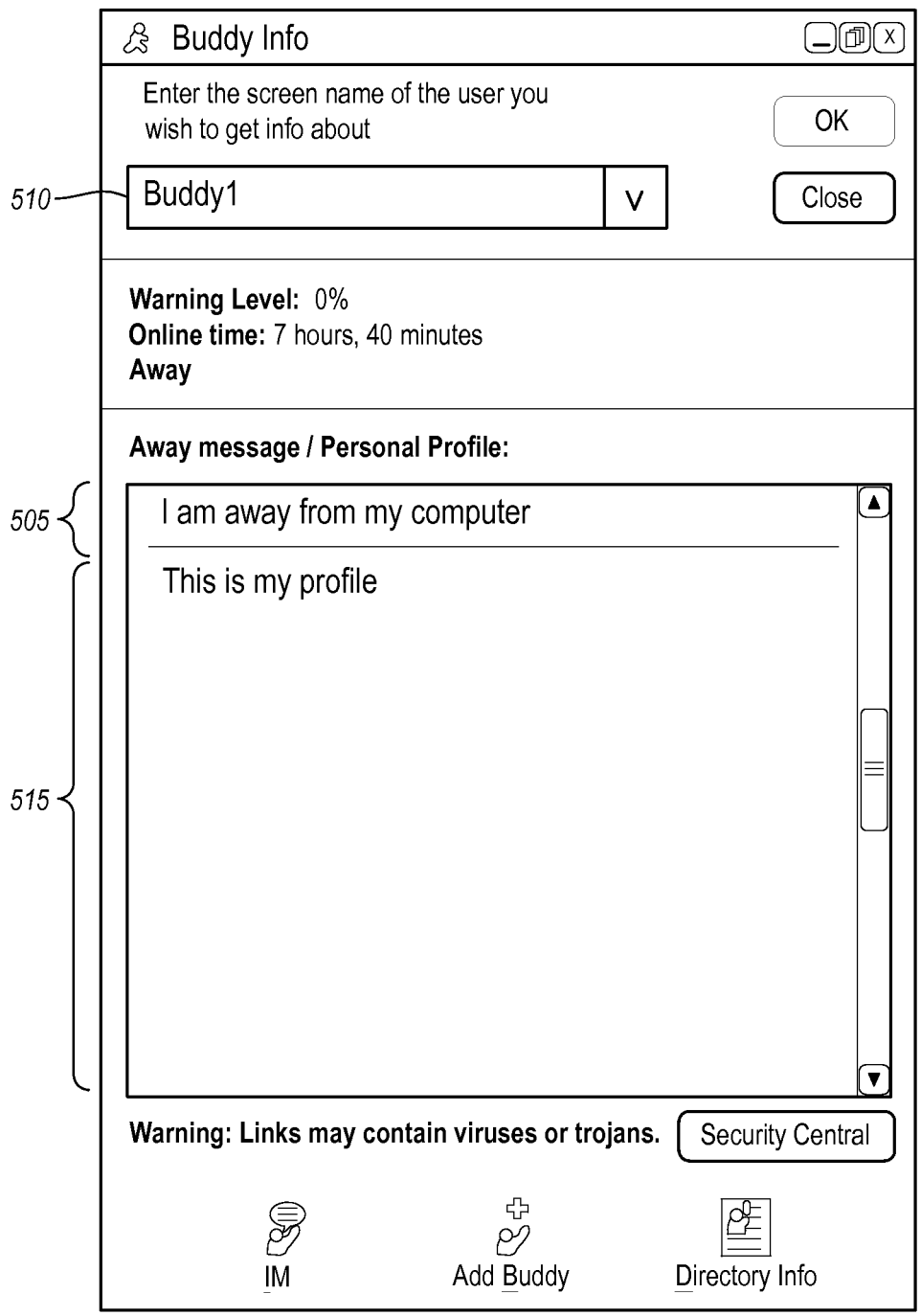
FIGS. 5-7 are illustrations of interfaces displaying electronic messages that describe users.

Referring to FIG. 5, an away message display interface 500 displays an away message 505 describing a particular user. The user for which the away message is displayed is identified in a text box 510. The away message display interface 500 also may display separately a profile 515 of the user, particularly when the profile is not included in the away message 505. The combination of the away message 505 and the profile 515 provides information describing the user to an individual for which the away message display interface 500 is displayed.

Figure 6:
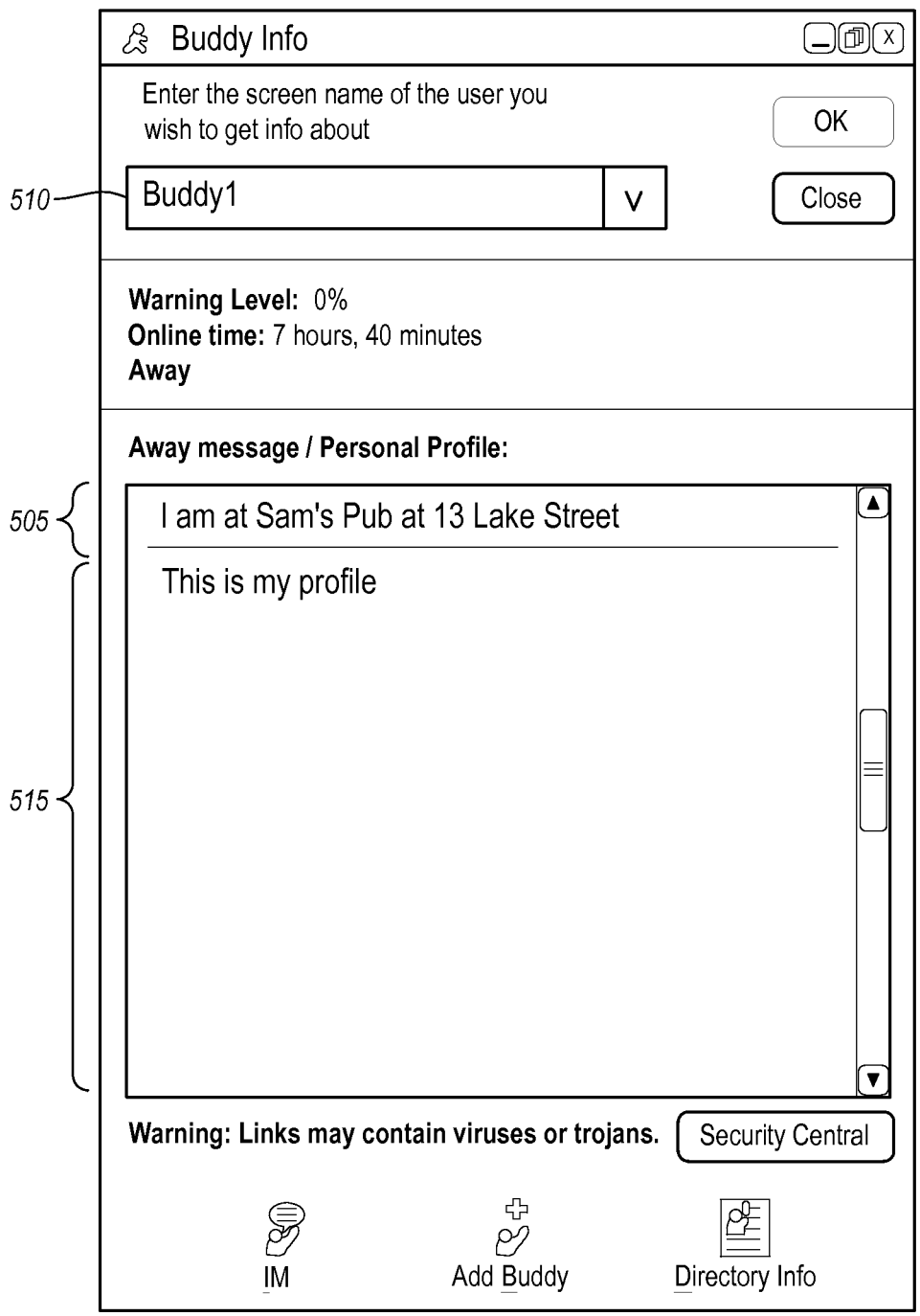

The interface 500 illustrated in FIG. 5 may be displayed prior to execution of the process 300 of FIG. 3. Consequently, the away message 505 and the profile 515 do not include an indication of a geographic location of the user. Referring also to FIG. 6, the interface 500 also may be displayed after a first execution of the process 300. At the time of the first execution of the process 300 by a mobile device of the user, the user and the mobile device may be located at "Sam's Pub at 13 Lake Street." Such a representation of the location of the mobile device may be identified and included in the away message 505 as a result of the first execution of the process 300. When the away message 505 is requested and displayed as illustrated in FIG. 6, the away message 505 includes the representation of the location.

Figure 7:
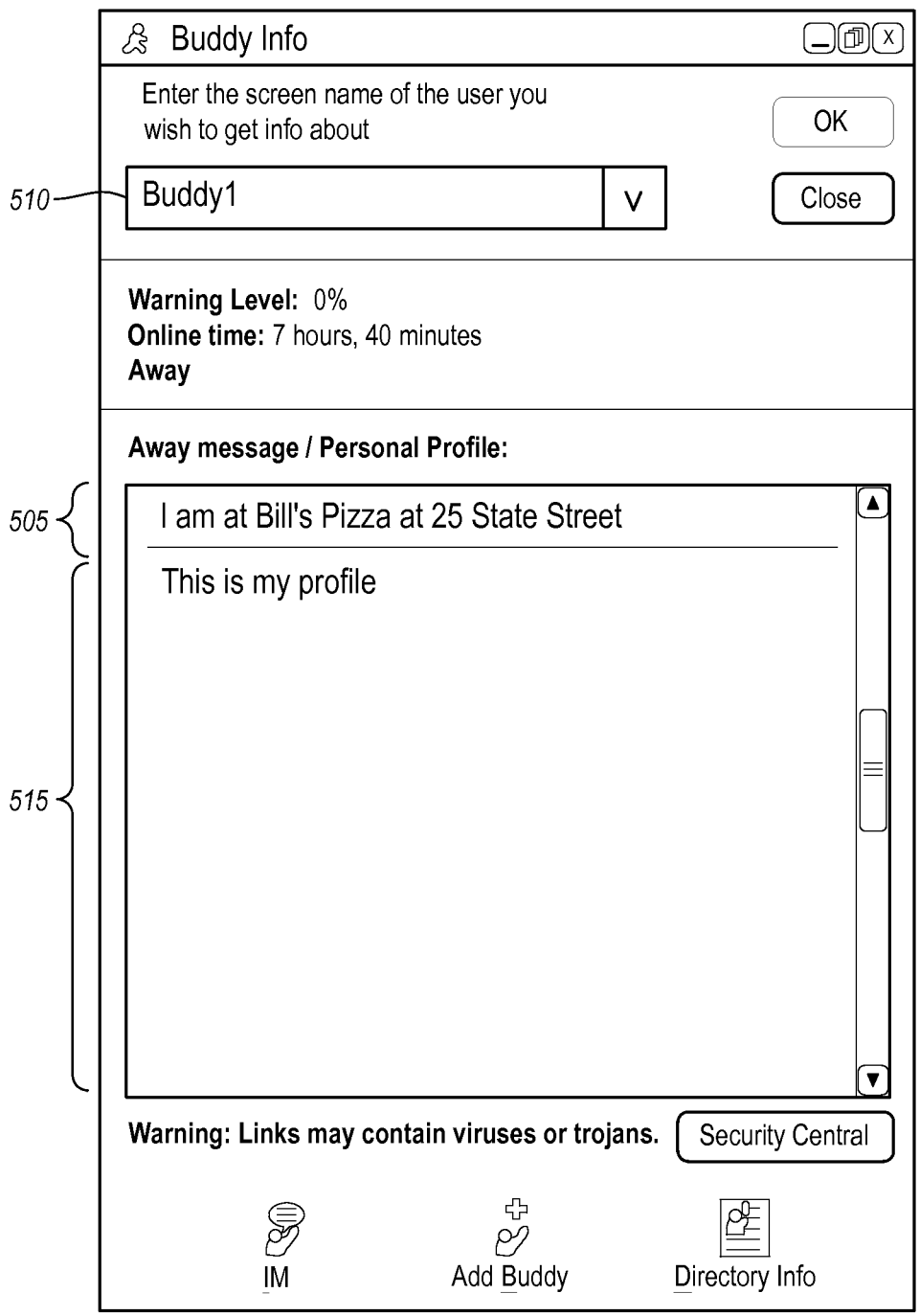

Referring also to FIG. 7, the interface 500 also may be displayed after a subsequent execution of the process 300. At the time of the subsequent execution of the process 300 by the mobile device of the user, the user and the mobile device may have moved from "Sam's Pub" to "Bill's Pizza at 25 State Street." Such a representation of the location of the mobile device may be identified and included in the away message 505 as a result of the subsequent execution of the process 300. When the away message 505 is requested and displayed as illustrated in FIG. 7, the away message 505 includes the representation of the location.

Figure 8A:
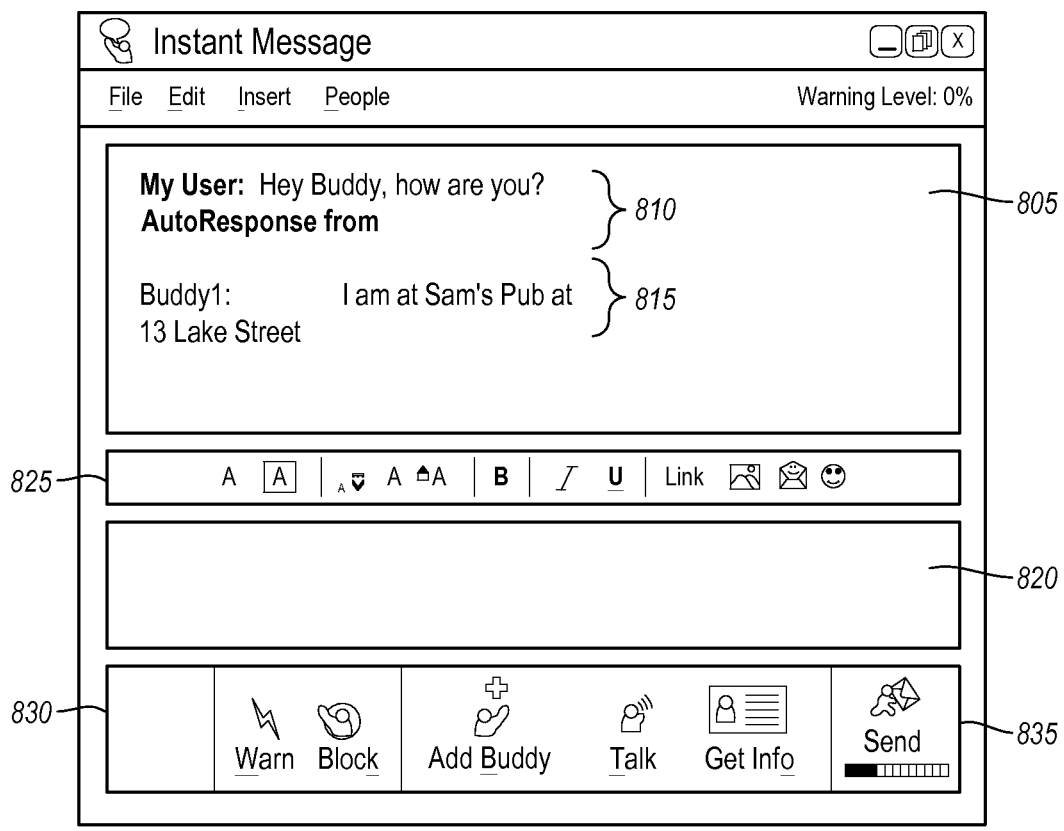
FIG. 8A is an interface for displaying an electronic message describing a user as a response to an electronic message to the user.

Referring also to FIG. 8A, an away message including information describing a user's location may be displayed in an instant messaging interface 800, which enables instant messages to be sent and received. A sender of instant messages may use the instant messaging interface 800 to send an instant message to a recipient for which the process 300 was executed previously.

The instant messaging interface 800 includes a message history box 805 that lists the instant messages sent between the sender and the recipient. The message history box 805 also may be referred to as a message transcript box 805. Each message is presented with an indication of an identifier by which the sender or the recipient is identified as the sender of the message. Each message listed in the message history box 805 also includes the text of the instant message sent by the sender or the recipient. For example, the message history box 805 includes a message 810 sent by a user with a screen name "MyUser" and a message 815 sent by a user with a screen name "Buddy1." In one implementation, each message listed in the message history box 805 includes a time stamp of when the message was sent. The users that sent the messages 810 and 815 are the recipient and the sender, respectively. In some implementations, the message history box may include automatically sent messages that were not specified manually by the sender of the recipient. For example, the automatically sent messages may inform the recipient that the sender has not used the instant messaging interface 800 for more than a threshold amount of time.

In typical implementations, the message history box 805 includes only those instant messages sent between the sender and the recipient after the interface 800 was displayed initially. In other implementations, the instant messages reflected in the message history box 805 may be saved when the interface 800 is dismissed, for example, such that the message history box 805 may be repopulated with those instant messages when the interface 800 is displayed again at a later time.

The instant messaging interface 800 also includes a message specification box 820 in which the sender may specify a message to be sent to the recipient. The sender may enter text to be sent to the recipient in the message specification box 820. The instant message interface 800 includes a set of format controls 825 that may be used to format the text entered in the message specification box 820. More particularly, the controls in the set of format controls 825 enable the user to change the size, foreground color, background color, style, and effects of the text entered in the message specification box 820. The set of format controls 825 also includes controls for inserting objects that are not plain text, such as hyperlinks and emoticons, into the message specification box 820.

After a message has been specified in the message specification box 820, the message may be sent by selecting a send button 825 included in a second control set 830. After the send button 835 has been selected, the text that has been entered in the message specification box 820 is sent to the recipient, and the message specification box 820 is cleared. The message is added to the message history box 805. The message also is displayed in a message history box 805 of an instance of the instant messaging interface 800 being viewed by the recipient. Also included in the second control set 830 are controls for warning instant message senders, blocking instant messages from particular senders, or adding another sender to a participant list used by the sender.

The recipient with the identifier "Buddy1" may be unavailable to send and receive instant messages at a time when the sender with the identifier "MyUser" sent the message 810. As a result the recipient may have chosen a descriptive message to be sent automatically to other users, such as the sender, that send the recipient instant messages. The descriptive message may include a representation of the geographic location of the recipient that was identified and included in the descriptive message through execution of the process 300 of FIG. 3. The message 815, which indicates that the recipient is located at "Sam's Pub at 13 Lake Street," may represent such a descriptive message, which is why the message 815 is labeled as an "AutoResponse from Buddy1." The message 815 may be processed or simply presented to the sender with the instant messaging interface 800. The sender may continue to send instant messages to the recipient, if so desired.

Figure 8B:
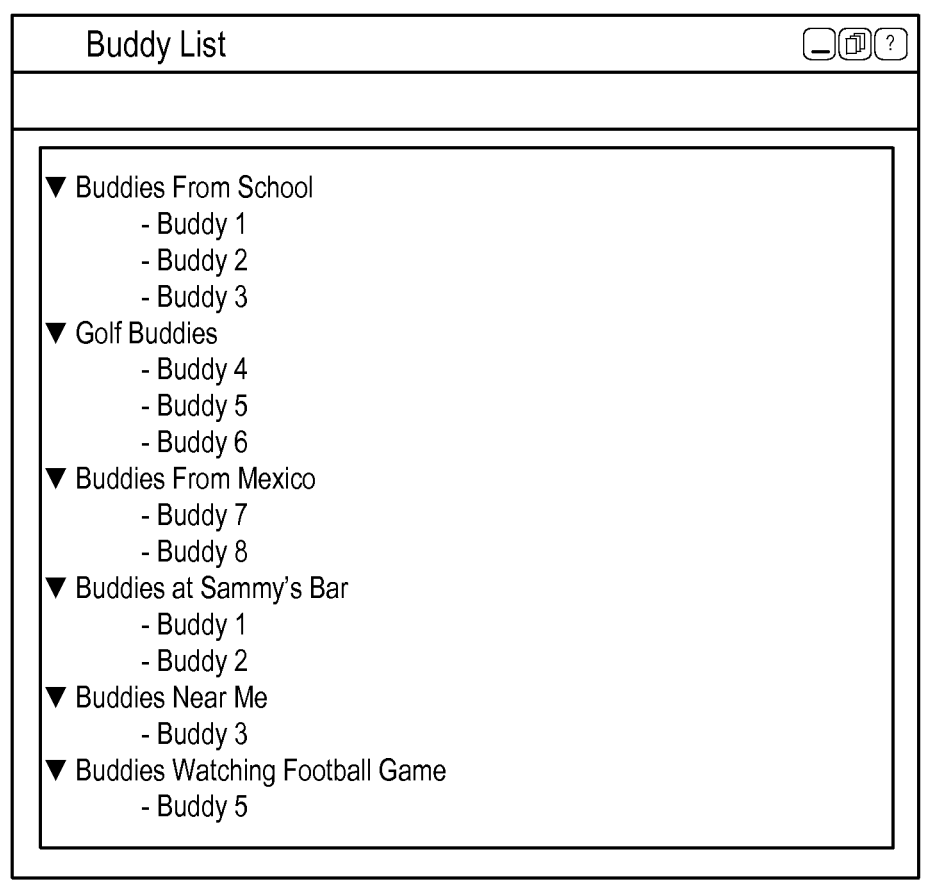
FIG. 8B is an illustration of a participant list.

Referring to FIG. 8B, the system can highlight or otherwise visually distinguish buddies that are co-located. Buddies may be sorted by location. The location sort can include offline buddies. The description of the location can be customized by the user (e.g., user could define criteria for "near" and have a "proximate buddies" group, or user could have a "Santa Fe" buddy group).

Members may be allowed to add buddy list groups to their buddy list, which correspond to locations and which are auto-populated based on physical presence at a location. For example, if a user puts a category on his buddy list, the user can autopopulate members into that category based on their detected physical proximity to that location. E.g., the local bar is added to the buddy list as a category. Assuming that the actual location of that bar is known and associated with that category, and the physical location of my buddies is knowable (e.g., via their cell device), their online identity may be auto-populated into that category as a projection of "physical presence" when they get w/in 500 feet of the location of that bar.

A buddy list group may be autocreated to include a location category, when we detect the presence of buddies at that location. The group may be autocreated only if more than one user is located in the location corresponding to the autocreated buddy list group. For example, to the extent that two buddies of a user are at the local pub, a buddy list group appears on the user's buddy list that reflects the name of the pub, and which is autopopulated with the buddies presently located in the pub. An indication of online presence can be provided for the buddies that are autopopulated to the group, such that two forms of presence are reflected for each buddy (online presence, and physical presence). Note that a buddy's physical presence at the pub may be detected explicitly (e.g., based on GPS information) or it may be inferred (e.g., based on their away message indicating presence at the pub). Moreover, to the extent that GPS detection is relied upon, their physical presence at the pub may be detected/reflected only if the user is literally positioned at the pub's coordinates, or presence may be detected/reflected if the user's GPS position is within a threshold minimum distance from the pub. Other aspects include varying the threshold minimum distance for physical presence detection based on location, or location type (e.g., detect position at a pub only upon coordinate match, but detect position at sporting venue if within threshold distance). This concept goes beyond showing location of users; it is intended to cover the concept of autopopulating a user's buddy list with groups based on real-time changes in presence information, whether online presence or physical presence.

A method of displaying electronic information in an instant-messaging application, the method comprising: detecting that a first user that has an identifier included in a list of user for which presence information is monitored is in physical proximity to a geographic location; detecting that a second user that has an identifier included in a list of user for which presence information is monitored is in physical proximity to the geographic location; and without receiving a request from the user, indicating that the first and second users are each in physical proximity to the geographic location.

Figure 9:
FIG. 9 is an interface for displaying electronic messages describing multiple users.

Referring to FIG. 9, an away message display interface 900 is similar to the away message display interfaces 500 of FIGS. 5-7. However, instead of displaying information describing a single user, the away message display interface 900 displays information describing multiple users. In one implementation, the interface 900 is a web page that may be displayed in a web browser. In another implementation, the interface 900 may be configured for display on a device with limited display capabilities, such as a mobile device.

Identifiers 905a-905d for the users are displayed on the left side of the interface 900. Away messages 910a-910d describing the users are displayed next to the identifiers 905a-905d. A profile of a user may be displayed next to the identifier of the user in the interface 900, for example, when the profile is not included in the away message for the user, of when the user has not otherwise indicated that the profile is no to be displayed. For example, the interface 900 includes a profile 915a of the user corresponding to the identifier 905a and a profile 915b of the user corresponding to the identifier 905d. In the illustrated implementation, the profiles 915a and 915b are displayed next to the identifiers 905a and 905d.

One or more of the away messages 910a-910d may include a representation of a geographic location of a corresponding user. The representation may be included in the away message through execution of the process 300 of FIG. 3 on behalf of the corresponding user. For example, the away message 910b for the user corresponding to the identifier 905b includes a representation of the location of the user. For example, in the illustrated implementation, the away message 910b indicates that the user is at "Sam's Pub at 13 Lake Street."

Save selected away messages (journaling) to your PC and/or post them to a blog, journal, or web page. A collection of a person's away messages can often tell the story of their life. Younger users often change their away message several times throughout the day, reflecting their thoughts, moods, and actions. This tool will allow users to post away messages to the AOL Journals infrastructure. Not all away messages will be stored, only ones that the user opts to save or post. Also, not all buddies can view this page—the user can opt to let everyone, everyone except blocked users, only buddies, only a certain list of buddies, or no one to see this. As such, a chronology of a user's away messages, e.g., from a specified period of time, may be posted to a BLOG. The user's friends may be allowed to see where the user has been (as reflected by the user's away messages) and to comment on the chronology.

The system can allow buddies to privately and/or publicly comment on your away messages. Within the All-in-One Away Message page or an individual "Get buddy info" selection, users will be able to comment on other's away messages and profiles. A user will "opt-in" if they would like anyone's comments to be public on either their journal and/or directly on their away message that is displayed immediately in the box that appears after selecting "Get Buddy Info" All comments are either public or private. The AIM user can say that no one can comment, only people on their buddy list can comment, or only a select group can comment. Also users will have the ability to pre-screen, comment, or delete any and all comments. An icon can appear if someone comments on another's "board" in the box that appears after selected "Get Buddy Info" to encourage circulation and traffic.

Figure 10:
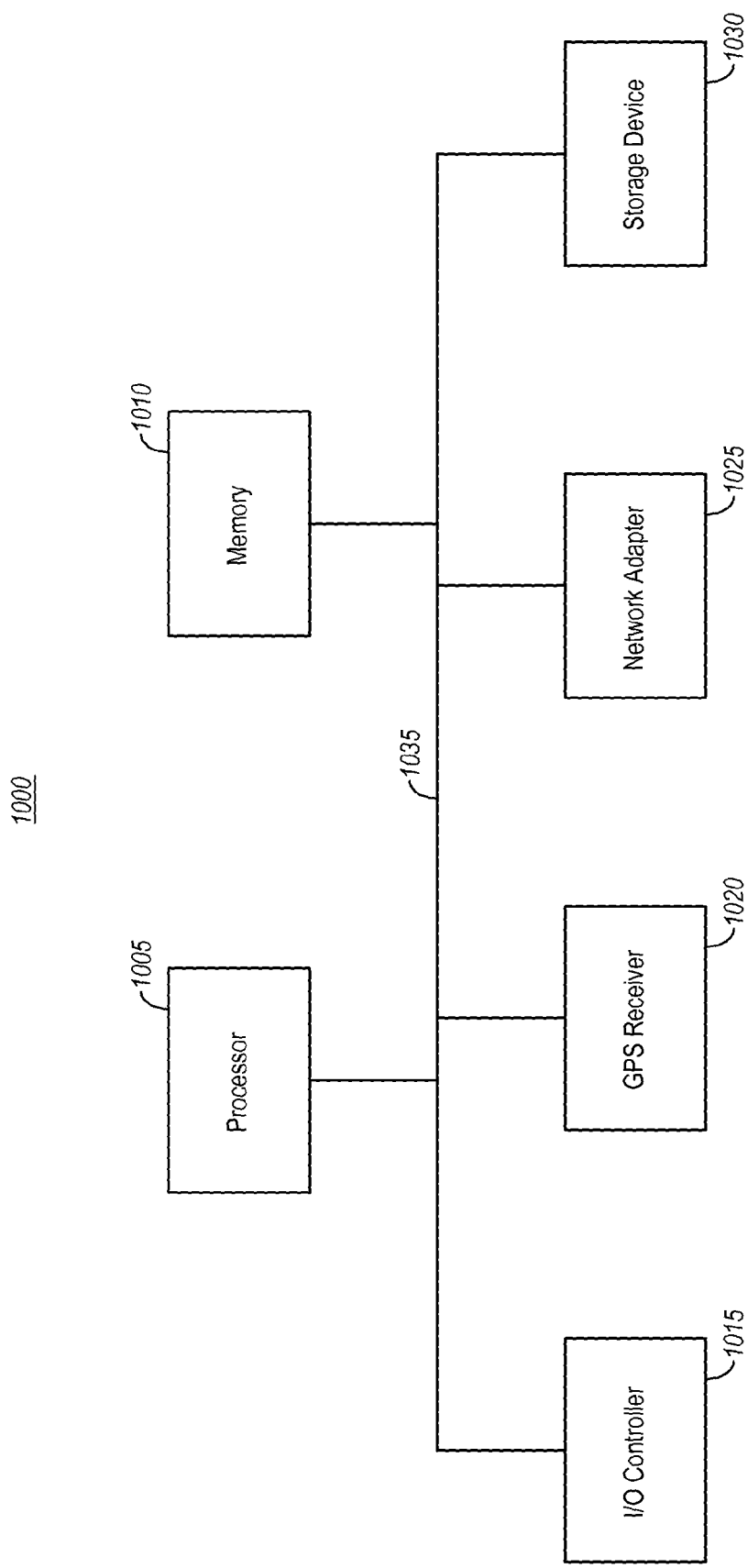
FIG. 10 is a block diagram of a computing device that may be included within the client and server systems shown in FIG. 1, according to one implementation.

FIG. 10 is a block diagram of a computing device 1000 that may be included within the IM server 102 and/or the client devices 108a and 108b. The computing device 1000 may represent a general-purpose computer, a special-purpose computer, or a mobile computing device, such as a portable computer, a mobile telephone, or a PDA. The computing device 1000 includes a processor 1005, a memory 1010, an input/output controller 1015, a GPS receiver 1020, a network adapter 1025, and a storage device 1030. Each of the components 1005, 1010, 1015, 1020, 1025, and 1030 are interconnected using a system bus 1035.

The processor 1005 is capable of processing instructions for execution within the computing device 1000. In one implementation, the processor 1005 is a single-threaded processor. In another implementation, the processor 1005 is a multi-threaded processor. The processor 1005 is capable of processing instructions stored in the memory 1010 or on the storage device 1025 to display graphical information for a GUI on an external input/output device that is coupled to the input/output controller 1015.

The memory 1010 stores information within the computing device 1000. In one implementation, the memory 1010 is a computer-readable medium. In one implementation, the memory 1010 is a volatile memory unit. In another implementation, the memory 1010 is a non-volatile memory unit.

The input/output controller 1015 manages input/output operations for the computing device 1000. In one implementation, the input/output controller 1015 is coupled to an external input/output device, such as a keyboard, a pointing device, or a display unit that is capable of displaying various GUIs, such as the GUIs shown in the previous figures, to a user.

The GPS receiver 1020 is similar to the GPS application 205 of FIG. 2. The GPS receiver 1020 is configured to receive signals from multiple GPS satellites, such as the satellite devices 210*a*-210*c* of FIG. 2, and to use the received signals to calculate a location of the computing device 1000, for example, as GPS coordinates.

The computing device 1000 uses the network adapter 1025 to communicate with other network devices. If, for example, the client device 108*a* is a mobile device that includes the computing device 1000, the computing device 1000 uses its network adapter 1025 to communicate with the host server 106 over a wireless connection.

The storage device 1030 is capable of providing mass storage for the computing device 1000. In one implementation, the storage device 1030 is a computer-readable medium. In various different implementations, the storage device 1030 may be a floppy disk device, a hard disk device, an optical disk device, or a tape device.

In one implementation, a computer program product is tangibly embodied in an information carrier. The computer program product contains instructions that, when executed, perform one or more methods, such as those described above. The information carrier is a computer- or machine-readable medium, such as the memory 1010, the storage device 1030, or a propagated signal.

A number of implementations have been described. Nevertheless, it will be understood that various modifications may be made. Accordingly, other implementations are within the scope of the following claims.

We claim:

1. A method comprising:
   determining, by one or more processors, geographic locations of mobile devices associated with co-users of a user;
   providing a user interface with user identifiers of one or more of the co-users of the user;
   determining, by the one or more processors, that the geographic locations of at least two mobile devices associated with two or more co-users are each near a common location;
   generating, by the one or more processor, an identifier representing the common location; and
   populating, by the one or more processors, the user interface with the identifier.

2. The method as recited in claim 1, further comprising:
   detecting, by the one or more processors, a selection of the identifier; and
   in response to the selection of the identifier, providing an indication of the co-users of the user at the common location represented by the identifier.

3. The method as recited in claim 2, wherein providing an indication of the co-users of the user at the common location represented by the identifier comprises providing user identifiers for each of the co-users at the common location.

4. The method as recited in claim 1, further comprising updating the positioning of the user identifiers within the user interface to reflect real-time changes in the geographic locations of the mobile devices associated with the co-users.

5. The method as recited in claim 4,
   determining that the mobile devices associated with the co-user is no longer located at the location; and
   disassociating, by the one or more processors, the user identifier of the co-user with the identifier based on the co-user no longer being located at the location.

6. The method as recited in claim 1, further comprising:
   determining a status of the co-users of the user; and
   modifying a characteristic of the user identifiers of the co-users in the user interface to indicate the status of the co-users.

7. The method as recited in claim 6, wherein determining a status of the co-users of the user comprises determining if the co-users are logged into or active on a communications system.

8. The method as recited in claim 1, wherein the user interface comprises a buddy list interface.

9. The method as recited in claim 1, wherein determining, by the one or more processors, that the first and second geographic locations are each near the common location comprises determining that the first and second geographic locations are each within a predetermined distance from coordinates of the common location.

10. A method comprising:
    identifying, by at least one processor, geographic locations of mobile devices associated with co-users of a user;
    providing, by the at least one processor, a user interface with user identifiers of one or more of the co-users of the user;
    positioning, by the at least one processor, the user identifiers of one or more of the co-users within the user interface to reflect the geographic locations of the mobile devices associated with the co-users;
    receiving an indication of a location by the user;
    adding an identifier to the user interface representing the location;
    determining that a co-user is located at the location based on the identified geographic location of a mobile device associated with the co-user; and
    associating, by the one or more processors, a user identifier of the co-user with the identifier.

11. The method as recited in claim 10, further comprising updating the positioning of the user identifiers within the user interface to reflect real-time changes in the geographic locations of the mobile devices associated with the co-users.

12. The method as recited in claim 11, further comprising:
    determining that the mobile devices associated with the co-user is no longer located at the location; and
    disassociating, by the one or more processors, the user identifier of the co-user with the identifier based on the co-user no longer being located at the location.

13. The method as recited in claim 12, wherein the user interface comprises a buddy list.

14. The method as recited in claim 13, wherein:
the identifier comprises a category; and
associating the user identifier of the co-user with the identifier comprises positioning the user identifier under the category.

15. The method as recited in claim 10, wherein, identifying, by the at least one processor, the geographic locations of the mobile devices associated with the co-users of the user comprises: receiving indications of geographic locations of the mobile devices associated with the co-users from the mobile devices.

16. The method as recited in claim 10, further comprising:
determining a status of the co-users of the user; and
modifying a characteristic of the user identifiers of the co-users in the user interface to indicate the status of the co-users.

17. The method as recited in claim 16, wherein determining a status of the co-users of the user comprises determining if the co-users are logged into or active on a communications system.

18. A system comprising:
one or more processors; and
one or more non-transitory computer-readable media having stored thereon computer-executable instructions that, when executed by the one or more processors, cause the system to:
determine geographic locations of mobile devices associated with co-users of a user;
provide a user interface with user identifiers of one or more of the co-users of the user;
determine that the geographic locations of at least two mobile devices associated with two or more co-users are each near a common location;
generate an identifier representing the common location; and
populate the user interface with the identifier.

19. The system as recited in claim 18, wherein the instructions when executed by the one or more processors, cause the system to update the positioning of the user identifiers within the user interface to reflect real-time changes in the geographic locations of the mobile devices associated with the co-users.

20. The system as recited in claim 18, wherein the instructions when executed by the one or more processors, cause the system to:
detect a selection of the identifier; and
in response to the selection of the identifier, provide an indication of the co-users of the user at the location represented by the identifier.

\* \* \* \* \*